United States Patent
Omae et al.

(10) Patent No.: US 7,362,729 B2
(45) Date of Patent: Apr. 22, 2008

(54) MOBILE NODE, MOBILE COMMUNICATION SYSTEM, AND COMMUNICATION CONTROL PROGRAM

(75) Inventors: Koji Omae, Yokohama (JP); Hideaki Takahashi, Yokohama (JP); Ichiro Okajima, Yokohama (JP); Narumi Umeda, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 827 days.

(21) Appl. No.: 10/386,569

(22) Filed: Mar. 13, 2003

(65) Prior Publication Data

US 2003/0214923 A1 Nov. 20, 2003

(30) Foreign Application Priority Data

Mar. 13, 2002 (JP) ............................. P2002-068918
Mar. 13, 2002 (JP) ............................. P2002-068932

(51) Int. Cl.
*H04Q 7/00* (2006.01)
(52) U.S. Cl. .................. 370/331; 370/469; 370/443; 370/390; 455/442; 455/445; 455/450; 455/509
(58) Field of Classification Search ............... 370/331, 370/469, 390, 443; 455/450, 509, 442, 445
See application file for complete search history.

(56) References Cited

U.S. PATENT DOCUMENTS 6,324,207 B1   11/2001 Kanterakis et al.
6,466,556 B1 * 10/2002 Boudreaux ................. 370/331
6,603,972 B1    8/2003 Sawyer

FOREIGN PATENT DOCUMENTS

CN   1147886 A   4/1997
CN   1286555 A   3/2001

(Continued)

OTHER PUBLICATIONS

Krishnamurthi et al., "Buffer Management for Smooth HandOvers in Mobile IPv6,"Standard-Working-Draft, Internet Engineering Task force, IETF, XP-015031214, Mar. 10, 2001, pp. 1-24.*

(Continued)

*Primary Examiner*—Joseph Feild
*Assistant Examiner*—Pierre-Louis Desir
(74) *Attorney, Agent, or Firm*—Oblon, Spivak, McClelland, Maier & Neustadt, P.C.

(57) ABSTRACT

In a state I, a link layer of a mobile host is connected to an access router and a default router is set to the access router such that data packets (P1) and (P2) reach the access router and are routed to a correspondent host. In states II and III, data packets (P3) to (P8) are not transmitted but are buffered. When the mobile host switches the default router from the access router to an access router upon reception of a router advertisement from the access router, processing moves to a state IV and the buffered data packets (P3) to (P8) are transmitted. Since the link layer of the mobile host is connected to the access router and the default router is set to the access router, the data packets (P3) to (P8) reach the access router and are routed to the correspondent host.

11 Claims, 28 Drawing Sheets

FOREIGN PATENT DOCUMENTS

| | | |
|---|---|---|
| EP | 0 798 943 A2 | 10/1997 |
| EP | 1 079 653 A1 | 2/2001 |
| JP | 9-284211 | 10/1997 |
| JP | 10-308775 | 11/1998 |
| JP | 11-331208 | 11/1999 |
| JP | 2000-224194 | 8/2000 |
| WO | WO 98/47302 | 10/1998 |
| WO | WO 01/76162 A1 | 10/2001 |

OTHER PUBLICATIONS

Govin Krishnamurthi, et al., "Buffer Management for Smooth Handovers in IPv6" Standard-Working-Draft, Internet Engineering Task Force, IETF, XP-015031214, Mar. 1, 2001, pp. 1-26.

Karim El Malki, et al., "Hierarchical Mobile IPv4/v6 and fast Handoffs: draft-elmalki-soliman-hmipv4v6-00.txt", Internet Engineering Task Force Internet Draft, XP-002234532, Mar. 10, 2000, pp. 1-24.

Patent Abstracts of Japan, JP 2000-349829, Dec. 15, 2000 (with Figure).

* cited by examiner

MOBILE NODE, MOBILE COMMUNICATION SYSTEM, AND COMMUNICATION CONTROL PROGRAM

BACKGROUND OF THE INVENTION

1. Field of the Invention

The present invention relates to a mobile node, a mobile communication system, and a communication control program.

2. Related Background Art

FIG. 19 is a block diagram showing an example of a first mobile communication system in which a mobile node is a mobile host. In FIG. 19, MH indicates a mobile host, HA indicates a home agent, AR indicates an access router, and CH indicates a correspondent host. As shown in FIG. 19, a mobile communication system 101 comprises a mobile host 103, a home agent 105, a plurality of access routers 107, 109, a correspondent host 111, and an IP network 113.

The home agent 105 provides the mobile host 103 with a home link. The access routers 107, 109 provide the mobile host 103 with wireless links (to be referred to as "external links" hereinafter) other than the home link. The correspondent host 111 performs communication with the mobile host 103.

The mobile host 103 uses a home address on a home link, and on an external link uses the home address and a care-of address having a link prefix for each external link. The mobile host 103 notifies the home agent 105 of binding which states "home address of this node" and "care-of address obtained by connection link", and the home agent 105 stores this binding. When the home agent 105 receives a packet addressed to the home address of the mobile host 103, the home agent 105 creates an IP packet addressed to the bound care-of address, stores this packet in a payload portion, and forwards the packet to the mobile host 103. Having received the forwarded packet, the mobile host 103 extracts the original packet from the payload portion. The internal packet is addressed to the mobile host 103 and can therefore be received thereby.

Next, state transitions of a conventional mobile host during a hand-off in the mobile communication system 101 of the aforementioned constitution will be described on the basis of FIG. 20. It is assumed here that the mobile host 103 communicates with the correspondent host 111 in a stationary network.

As shown in FIG. 20, the state transitions of the mobile host 103 during a hand-off are divided into four.

State I: the link layer of the mobile host 103 is connected to the access router 107. The care-of address of the mobile host 103 is set at CoA1, and a default router is set to the access router 107.

State II: the link layer of the mobile host 103 switches connection point from the access router 107 to the access router 109. The period during this connection point switching is known as a link layer disconnection period. At this time, the care-of address of the mobile host 103 is CoA1, and the default router is the access router 107.

State III: the link layer of the mobile host 103 is connected to the access router 109. At this time, the care-of address of the mobile host 103 is still CoA1, and the default router is still the access router 107. This state continues until the mobile host 103 receives a router advertisement from the access router 109 and switches the default router from the access router 107 to the access router 109.

State IV: this is the state which follows reception of the router advertisement from the access router 109, alteration of the care-of address of the mobile host 103 to CoA2, and switching of the default router from the access router 107 to the access router 109. At this time, the link layer connection point and the default router are both the access router 109. The mobile host 103 notifies the home agent 105 of binding for the home address and new care-of address CoA2 by means of a binding update packet.

The link layer connection points, default routers, and care-of addresses in these states I to IV are summarized in Table 1.

TABLE 1

| STATE | LINK LAYER CONNECTION POINT | DEFAULT ROUTER | CARE-OF ADDRESS |
|---|---|---|---|
| I | AR107 | AR107 | CoA1 |
| II | NONE(BREAK) | AR107 | CoA1 |
| III | AR109 | AR107 | CoA1 |
| IV | AR109 | AR109 | CoA2 |

As shown in FIG. 20, the state transitions of the home agent 105 during a hand-off are divided into two.

State A: binding for the home address and care-of address CoA1 of the mobile host 103 is recorded in the home agent 105. The home agent 105 transfers packets addressed to the mobile host 103 transmitted from the correspondent host 111 to the care-of address CoA1. This state continues until a binding update packet notifying the home address and new care-of address CoA2 is received from the mobile host 103.

State B: binding for the home address and new care-of address CoA2 of the mobile host 103 is recorded in the home agent 105. The home agent 105 transfers packets addressed to the mobile host 103 transmitted from the correspondent host 111 to the new care-of address CoA2.

The bound care-of addresses in these states A and B are summarized in Table 2.

TABLE 2

| STATE | BOUND CARE-OF ADDRESS |
|---|---|
| A | CoA1 |
| B | CoA2 |

FIG. 21 is a block diagram showing an example of a second mobile communication system in which a mobile node is a mobile router. In FIG. 21, SH is a stationary host, MR is a mobile router, HA is a home agent, AR is an access router, and CH is a correspondent host. As shown in FIG. 21, a mobile communication system 201 comprises a mobile router 203, a stationary host 205, the home agent 105, the plurality of access routers 107, 109, the correspondent host 111, the IP network 113, and a mobile network 207.

The home agent 105 provides the mobile router 203 with a home link. The access routers 107, 109 provide the mobile router 203 with external links other than the home link. The mobile network 207 moves while maintaining the connection relationship between its internal nodes (the mobile router 203 and the stationary host 205). The correspondent host 111 performs communication with the nodes on the mobile network 207.

The mobile router 203, which is a gateway router for the mobile network 207, uses a home address on a home link, and on an external link uses the home address and a care-of address having a link prefix for each link. The mobile router 203 notifies the home agent 105 of binding which states "home address of this node and network prefixes within mobile network 207" and "care-of address obtained by connection link". The home agent 105 stores the binding received from the mobile router 203. When the home agent 105 receives a packet addressed to the home address of the mobile router 203 or a packet addressed to an address belonging to a network prefix in the mobile network 207, the home agent 105 creates an IP packet addressed to the bound care-of address, stores this packet in a payload portion, and forwards the packet to the mobile router 203. Having received this forwarded packet, the mobile router 203 extracts the original packet from the payload portion, and if addressed to another host within the mobile network 207 (the stationary host 205), the mobile router 203 routes the packet within the mobile network 207.

Next, state transitions of a conventional mobile router during a hand-off in the mobile communication system 201 of the aforementioned constitution will be described on the basis of FIG. 22. It is assumed here that the stationary host 205 within the mobile network 207 communicates with the correspondent host 111.

As shown in FIG. 22, the state transitions of the mobile router 203 during a hand-off are divided into four.

State I: the link layer of the mobile router 203 is connected to the access router 107. The care-of address of the mobile router 203 is set at CoA1, and a default router is set as the access router 107.

State II: the link layer of the mobile router 203 switches connection point from the access router 107 to the access router 109. The period during this connection point switching is known as a link layer disconnection period. At this time, the care-of address of the mobile router 203 is CoA1 and the default router is the access router 107.

State III: the link layer of the mobile router 203 is connected to the access router 109. At this time, the care-of address of the mobile router 203 is still CoA1, and the default router is still the access router 107. This state continues until the mobile router 203 receives a router advertisement from the access router 109 and switches the default router from the access router 107 to the access router 109.

State IV: this is the state which follows reception of the router advertisement from the access router 109, alteration of the care-of address of the mobile router 203 to CoA2, and switching of the default router from the access router 107 to the access router 109. At this time, the link layer connection point and the default router are both the access router 109. The mobile router 203 notifies the home agent 105 of binding for the home address and new care-of address CoA2 by means of a binding update packet.

The link layer connection points, default routers, and care-of addresses in these states I to IV are summarized in Table 3.

TABLE 3

| STATE | LINK LAYER CONNECTION POINT | DEFAULT ROUTER | CARE-OF ADDRESS |
|---|---|---|---|
| I | AR107 | AR107 | CoA1 |
| II | NONE(BREAK) | AR107 | CoA1 |
| III | AR109 | AR107 | CoA1 |
| IV | AR109 | AR109 | CoA2 |

As shown in FIG. 22, the state transitions of the home agent 105 during a hand-off are divided into two.

State A: binding for the home address of the mobile router 203, network prefixes within the mobile network 207, and care-of address CoA1 is recorded in the home agent 105. The home agent 105 transfers packets addressed to the stationary host 205 in the mobile network 207, transmitted from the correspondent host 111 inside a stationary network, to the care-of address CoA1. This state continues until a binding update packet providing binding for the home address, network prefixes within the mobile network 207, and new care-of address CoA2 is received from the mobile router 203.

State B: the binding for the home address of the mobile router 203, network prefixes within the mobile network 207, and new care-of address CoA2 is recorded in the home agent 105. The home agent 105 transfers packets addressed to the stationary host 205 within the mobile network 207, transmitted from the correspondent host 111 within the stationary network, to the new care-of address CoA2.

The bound care-of addresses in these states A and B are summarized in Table 4.

TABLE 4

| STATE | BOUND CARE-OF ADDRESS |
|---|---|
| A | CoA1 |
| B | CoA2 |

Next, an example of the state transitions of a conventional mobile host during a hand-off in a third mobile communication system in which the mobile node is a mobile host will be described on the basis of FIG. 23. In FIG. 23, MH indicates a mobile host, AR indicates an access router, and CH indicates a correspondent host.

It is assumed here that a mobile host 401 communicates with a correspondent host 407 on a stationary network. As shown in FIG. 23, the state transitions of the mobile host 401 during a hand-off are divided into four.

State I: the link layer of the mobile host 401 is connected to the access router 403, and the default router is set to the access router 403.

State II: the link layer of the mobile host 401 switches connection point from the access router 403 to the access router 405. The period during this connection point switching is known as a link layer disconnection period. At this time, the default router is still the access router 403.

State III: the link layer of the mobile host 401 is connected to the access router 405. At this time, the default router is still the access router 403. This state continues until the mobile host 401 receives a router advertisement from the access router 405 and switches the default router from the access router 403 to the access router 405.

State IV: this is the state which follows reception of the router advertisement from the access router 405 and switching of the default router from the access router 403 to the access router 405. At this time, the link layer connection point and the default router are both the access router 405. The link layer connection points and default routers in these states I to IV are summarized in Table 5.

TABLE 5

| STATE | LINK LAYER CONNECTION POINT | DEFAULT ROUTER |
|---|---|---|
| I | AR403 | AR403 |
| II | NONE(BREAK) | AR403 |

TABLE 5-continued

| STATE | LINK LAYER CONNECTION POINT | DEFAULT ROUTER |
|---|---|---|
| III | AR405 | AR403 |
| IV | AR405 | AR405 |

Next, the state transitions of a conventional mobile router during a hand-off in a fourth mobile communication system in which the mobile node is a mobile router will be described on the basis of FIG. 24. In FIG. 24, SH indicates a stationary host, MR indicates a mobile router, AR indicates an access router, and CH indicates a correspondent host.

It is assumed here that a stationary host 409 in a mobile network communicates with the correspondent host 407. As shown in FIG. 24, the state transitions of the mobile router 411 during a hand-off are divided into four.

State I: the link layer of the mobile router 411 is connected to the access router 403, and the default router is set to the access router 403.

State II: the link layer of the mobile router 411 switches connection point from the access router 403 to the access router 405. The period during this connection point switching is known as a link layer disconnection period. At this time, the default router is still the access router 403.

State III: the link layer of the mobile router 411 is connected to the access router 405. At this time, the default router is still the access router 403. This state continues until the mobile router 411 receives a router advertisement from the access router 405 and switches the default router from the access router 403 to the access router 405.

State IV: this is the state which follows reception of the router advertisement from the access router 405 and switching of the default router from the access router 403 to the access router 405. At this time, the link layer connection point and the default router are both the access router 405. The link layer connection points and default routers in these states I to IV are summarized in Table 6.

TABLE 6

| STATE | LINK LAYER CONNECTION POINT | DEFAULT ROUTER |
|---|---|---|
| I | AR403 | AR403 |
| II | NONE(BREAK) | AR403 |
| III | AR405 | AR403 |
| IV | AR405 | AR405 |

SUMMARY OF THE INVENTION

However, it has been found that the following problems exist in the state transitions of a conventional mobile node during a hand-off as described above.

First, a problem which arises when the mobile node is a mobile host in the first mobile communication system will be described.

As shown in FIG. 20, packets P1 and P3 transmitted from the correspondent host 111 to the mobile host 103 are normally transferred from the correspondent host 111 to the home agent 105 to the access routers 107, 109 to the mobile host 103 to thereby reach the mobile host 103. During a hand-off of the mobile host 103, however, some packets do not reach the mobile host 103. For example, when the packet indicated by P2 in FIG. 20 reaches the home agent 105, the home agent 105 is in state A, and thus the packet is transferred to the care-of address CoA1. If the mobile host 103 has already reached state II or further when this packet P2 is transmitted to the access router 107, the packet P2 does not reach the mobile host 103, and thus packet loss occurs.

A sequence occurring when the mobile host 103 hands off from the access router 107 to the access router 109 while in reception of data transfer using TCP from the correspondent host 111 is shown in FIG. 25. In FIG. 25, the solid line arrows represent control packets used for the hand-off, and the broken line arrows represent TCP data segments transmitted to the mobile host 103 from the correspondent host 111 and TCP acknowledgement signals (TCP acks) transmitted from the mobile host 103 to the correspondent host 111. States I to IV and states A and B in FIG. 25 correspond to the states I to IV and states A and B described in FIG. 20.

As shown in FIG. 25, the mobile host 103 does not stop transmitting TCP acks until directly before state II, and thus the correspondent host 111, having received these TCP acks, continues to transmit TCP data segments. Hence, as shown in FIG. 25, at least two TCP data segments P5 and P6 are lost in succession. When a plurality of TCP data segments is subject to such successive packet loss, TCP throughput declines dramatically.

FIG. 26 shows a sequence occurring when the mobile host 103 hands off from the access router 107 to the access router 109 during data transfer using TCP from the mobile host 103 to the correspondent host 111. The solid line arrows represent control packets used for the hand-off and the broken line arrows represent TCP data segments transmitted to the correspondent host 111 from the mobile host 103 and TCP acks transmitted from the correspondent host 111 to the mobile host 103. States I to IV and states A and B in FIG. 26 correspond to the states I to IV and states A and B described in FIG. 20.

As shown in FIG. 26, the mobile host 103 does not stop transmitting TCP data segments until directly before state II, and thus the correspondent host 111, having received these TCP data segments, continues to transmit TCP acks. Henceforth, as shown in FIG. 26, the TCP ack P7 is lost and no TCP acks reach the mobile host 103 following the hand-off. In this case, the mobile host 103 is unable to obtain an opportunity to transmit the next TCP data segment, and thus the TCP throughput declines dramatically.

Next, a problem which arises when the mobile node is a mobile router in the second mobile communication system will be described.

As shown in FIG. 22, packets P1 and P3 transmitted from the correspondent host 111 to the stationary host 205 are normally transferred from the correspondent host 111 to the home agent 105 to the access routers 107, 109 to the mobile router 203 to the stationary host 205 to thereby reach the stationary host 205. However, during a hand-off of the mobile router 203, some packets do not reach the stationary host 205. For example, if the home agent 105 is in state A when the packet indicated by P2 in FIG. 22 reaches the home agent 105, the packet P2 is transferred to the care-of address CoA1. If the mobile router 203 has already reached state II or further when this packet P2 is routed to access router 107, the packet P2 does not reach the mobile router 203. Naturally, the packet P2 does not reach the stationary host 205 within the mobile network 207 and thus packet loss occurs.

FIG. 27 shows a sequence occurring when the mobile router 203 hands off from the access router 107 to the access router 109 while the stationary host 205 in the mobile network 207 is in reception of data transfer from the correspondent host 111 using TCP. In FIG. 27, the solid line arrows represent control packets used for the hand-off and the broken line arrows represent TCP data segments transmitted from the correspondent host 111 to the stationary host 205 and TCP acks transmitted to the correspondent host 111 from the stationary host 205. States I to IV and states A and B in FIG. 27 correspond to the states I to IV and states A and B described in FIG. 22.

As shown in FIG. 27, the mobile router 203 does not stop routing TCP acks until directly before state II, and thus the correspondent host 111, having received these TCP acks, continues to transmit TCP data segments. Henceforth, as shown in FIG. 27, at least two TCP data segments P5 and P6 are lost in succession. When a plurality of TCP data segments is subject to such successive packet loss, TCP throughput declines dramatically.

Meanwhile, FIG. 28 shows a sequence occurring when the mobile router 203 hands off from the access router 107 to the access router 109 during the transfer of data from the stationary host 205 in the mobile network 207 to the correspondent host 111 using TCP. In FIG. 28, the solid line arrows represent control packets used for the hand-off and the broken line arrows represent TCP data segments transmitted to the correspondent host 111 from the stationary host 205 and TCP acks transmitted from the correspondent host 111 to the stationary host 205. States I to IV and states A and B in FIG. 28 correspond to the states I to IV and states A and B described in FIG. 22.

As shown in FIG. 28, the mobile router 203 does not stop routing TCP data segments until directly before state II, and thus the correspondent host 111, having received these TCP data segments, transmits TCP acks. Then, as shown in FIG. 28, the TCP ack P7 is lost and no TCP acks reach the stationary host 205 following the hand-off by the mobile router 203. In this case, the stationary host 205 is unable to obtain an opportunity to transmit a TCP data segment, and thus the TCP throughput declines dramatically.

Next, a problem arising in the state transitions of a mobile node during a hand-off in the third mobile communication system in which the mobile node is a mobile host will be described with reference to FIG. 23. When the link layer connection point and the default router match (state I and state IV), packets transmitted from the mobile host 401 to the correspondent host 407 are received in the access router which is set as the default router (access router 403 in state I and access router 405 in state IV) and routed to the correspondent host 407 in the stationary network. The mobile host continues to transmit packets addressed to the correspondent host during state II and state III also.

In state II and state III, the default router is the access router 403, and therefore the destination MAC (Media Access Control) address of these packets is the MAC address of the access router 403. However, since the connection between the link layer and the access router 403 has already been severed, these packets do not reach the access router 403 and are not routed to the stationary network. Hence the problem here is that packets transmitted to the correspondent host 407 from the mobile host 401 in state II or state III do not reach the correspondent host 407, or in other words packet loss occurs.

Next, a problem arising in the fourth communication system in which the mobile node is a mobile router will be described with reference to FIG. 24. Only when the link layer connection point and the default router in the mobile router 411 match (state I and state IV), packets which are transmitted to the correspondent host 407 from the stationary host 409 and routed along the way by the mobile router 411 are received in the access router which is set as the default router (access router 403 in state I and access router 405 in state IV) and routed to the correspondent host 407 inside the stationary network. The IP layer of the mobile router 411 continues to route packets addressed to the correspondent host 407 transmitted by the stationary host 409 in state II and state III also.

In state II and state III, the default router is the access router 403, and therefore the destination MAC address of these packets is the MAC address of the access router 403. However, since the connection between the link layer and the access router 403 has already been severed, these packets do not reach the access router 403 and are not routed to the stationary network. Hence the problem here is that packets transmitted from the stationary host 409 to the correspondent host 407 which are routed to the stationary network side by the mobile router 411 during state II and state III do not reach the correspondent host 407, or in other words packet loss occurs.

Hence an object of the present invention is providing a mobile node, mobile communication system, and communication control program which are capable of preventing the occurrence of packet loss during a hand-off period.

A mobile node according to the present invention is a mobile node for transmitting a packet comprising means for buffering the packet during a hand-off period and transmitting the buffered packet when this hand-off is complete, wherein the means determines the period during which the packet is buffered on the basis of the connection status of the link layer of the mobile node.

In the mobile node according to the present invention, packet which were to be transmitted during a hand-off period are buffered rather than being transmitted during the hand-off period, and the buffered packets are transmitted when the hand-off is complete. As a result, packet loss occurring during a hand-off period can be prevented.

It is preferable that the period during which packets are buffered by this means is a period from the beginning of a link layer disconnection period, during which the link layer of the mobile node is not connected to any external links in order to switch connection points, to the time following the end of the link layer disconnection period at which the access router providing the newly connected external link becomes the default router. With such a constitution, the packet buffering period can be set highly appropriately, whereby packet loss can be prevented with certainty.

It is also preferable that this means detects the beginning of the link layer disconnection period by a signal from an interface which is connected to the external link, and that this means detects a change in the default router by a signal from the IP layer of the mobile node. With such a constitution, the packet buffering period can be detected appropriately and easily.

It is also preferable that this means does not buffer a router solicitation for requesting transmission of a router advertisement from the access router. If all packets are buffered, then the following problem arises. It is generally preferable that the mobile node, having switched connection links, receives a router advertisement as early as possible in order to learn the default router on the newly connected link more quickly. Hence, the mobile node is capable of transmitting a router solicitation to an access router directly after the end of link connection point alteration using a multicast addressed to all of the routers on a link. However, when all of the packets are buffered, the router solicitation does not reach the access routers, and as a result reception of the router advertisement in the mobile node is delayed. If router solicitations are not buffered, then a router solicitation transmitted by the mobile node reaches the access routers and the mobile node is able to receive a router advertisement more quickly.

It is also preferable for the mobile node to receive a TCP data segment and transmit a TCP acknowledgement signal corresponding to this TCP data segment, and for the means to buffer the TCP acknowledgement signal during the hand-off period and transmit the buffered TCP acknowledgement signal when the hand-off is complete.

In this mobile node, TCP acknowledgement signals which were to be transmitted during the hand-off period are buffered during the hand-off period rather than being transmitted. The buffered TCP acknowledgement signals are transmitted when the hand-off is complete. Thus, since TCP acknowledgement signals are not transmitted during the hand-off period, no new TCP data segments are transmitted to the mobile node and no TCP data segments become subject to packet loss. When the TCP acknowledgement signals are transmitted following the hand-off period, new TCP data segments are transmitted to the mobile node. During the period in which the TCP acknowledgement signals are buffered, data transfer using TCP is halted, but this period equals the amount of time taken for the hand-off (approximately 100 ms or less). On the other hand, the period during which data transfer is halted due to successive TCP data segment loss equals the amount of time taken for a TCP retransmit timer to expire (equivalent to "Tr" in FIGS. 25 to 28, and at least one second, for example). Thus TCP throughput deterioration due to TCP acknowledgement signal buffering is smaller than TCP throughput deterioration due to successive TCP data segment loss. As a result, a dramatic deterioration in TCP throughput during the hand-off of the mobile node can be prevented.

It is also preferable that the period during which TCP acknowledgement signals are buffered by the means is a period from a predetermined time before the beginning of a link layer disconnection period, during which the link layer of the mobile node is not connected to any external links in order to switch connection points, to the time following the end of the link layer disconnection period at which the access router providing the newly connected external link becomes the default router. With such a constitution, the TCP acknowledgement signal buffering period can be set highly appropriately such that a dramatic deterioration in TCP throughput can be further prevented.

It is also preferable that the means detects the predetermined time before the beginning of the link layer disconnection period by a signal from an interface which is connected to the external link, and that the means detects a change in the default router by a signal from the IP layer of the mobile node. With such a constitution, a TCP acknowledgement signal buffering period can be detected appropriately and easily.

It is further preferable that the means performs TCP acknowledgement signal buffering upon each TCP connection, and that when, upon each TCP connection, a newly buffered TCP acknowledgement signal corresponds to a TCP data segment with a larger sequence number than a currently buffered TCP acknowledgement signal, the currently buffered TCP acknowledgement signal is replaced by the newly buffered TCP acknowledgement signal. With such a constitution, the space required for buffering TCP acknowledgement signals can be economized.

A mobile node may also transmit a TCP data segment, and the means may buffer the TCP data segment during the hand-off period and transmit the buffered TCP data segment when the hand-off is complete.

In this mobile node, TCP data segments which were to be transmitted during the hand-off period are not transmitted during the hand-off period but are buffered. The buffered TCP data segments are transmitted when the hand-off is complete. Thus, since TCP data segments are not transmitted during the hand-off period, no corresponding TCP acknowledgement signals are transmitted to the mobile node and no TCP acknowledgement signals become subject to packet loss. When the TCP data segments are transmitted following the hand-off period, TCP acknowledgement signals corresponding to the transmitted TCP data segments are transmitted to the mobile node. During the period in which the TCP data segments are buffered, data transfer using TCP is halted, but this period equals the amount of time taken for the hand-off (approximately 100 ms or less). On the other hand, the period in which data transfer is halted due to the inability to obtain an opportunity to transmit a TCP data segment equals the amount of time taken for a TCP retransmit timer to expire (equivalent to "Tr" in FIGS. 25 to 28, and at least one second, for example). Thus TCP throughput deterioration due to TCP data segment buffering is smaller than TCP throughput deterioration due to the inability to obtain an opportunity to transmit a TCP data segment. Hence a dramatic deterioration in TCP throughput during the hand-off of the mobile node can be prevented.

It is also preferable for the period during which the TCP data segments are buffered by the means to be a period from a predetermined time before the beginning of a link layer disconnection period, during which the link layer of the mobile node is not connected to any external links in order to switch connection points, to the time following the end of the link layer disconnection period at which the access router providing the newly connected external link becomes the default router. With such a constitution, the TCP data segment buffering period can be set highly appropriately and a dramatic deterioration in TCP throughput can be further prevented.

It is further preferable that the means detects the predetermined time before the beginning of the link layer disconnection period by a signal from an interface which is connected to the external link, and that the means detects a change in the default router by a signal from the IP layer of the mobile node. With such a constitution, the TCP data segment buffering period can be detected appropriately and easily.

Meanwhile, a mobile communication system according to the present invention comprises a mobile node for transmitting a packet and a plurality of access routers for providing the mobile node with external links, wherein the mobile node comprises means for buffering this packet during a hand-off period and transmitting the buffered packet to the access router providing the newly connected external link when the hand-off is complete, and the means determines the period during which the packet is buffered on the basis of the connection status of the link layer of the mobile node.

In the mobile node of the mobile communication system according to the present invention, packets which were to be transmitted during a hand-off period are not transmitted during the hand-off period but are buffered. When the hand-off is complete, the buffered packets are transmitted to the access router providing the newly connected external link. As a result, packet loss occurring during a hand-off period can be prevented.

It is preferable that the period during which the packets are buffered by the means is a period from the beginning of a link layer disconnection period during which the link layer of the mobile node is not connected to any external links in order to switch connection points to the time following the end of the link layer disconnection period at which the access router providing the newly connected external link becomes the default router. With such a constitution, the packet buffering period can be set highly appropriately and packet loss can be prevented with certainty.

It is also preferable that the means detects the beginning of a link layer disconnection period by a signal from an interface which is connected to the external link, and that the means detects a change in the default router by a signal from the IP layer of the mobile node. With such a constitution, the packet buffering period can be detected appropriately and easily.

It is further preferable that the means does not buffer a router solicitation for requesting transmission of a router advertisement from the access router. With such a constitution, a router solicitation transmitted by the mobile node reaches an access router, and thus the mobile node can receive a router advertisement more quickly.

The mobile node may also receive a TCP data segment transmitted from the access router and transmit to the access router a TCP acknowledgement signal corresponding to the TCP data segment, and the means of the mobile node may buffer the TCP acknowledgement signal during the hand-off period and transmit the buffered TCP acknowledgement signal to the access router providing the newly connected external link when the hand-off is complete.

In this mobile communication system, TCP acknowledgement signals which were to be transmitted during the hand-off period are not transmitted during the hand-off period but are buffered. The buffered TCP acknowledgement signals are transmitted to the access router providing the newly connected external link when the hand-off is complete. Thus, since TCP acknowledgement signals are not transmitted during the hand-off period, no new TCP data segments are transmitted to the mobile node from the correspondent node and no TCP data segments become subject to packet loss. When the TCP acknowledgement signals are transmitted to the access router following the hand-off period, new TCP data segments are transmitted to the mobile node from the correspondent node. During the period in which the TCP acknowledgement signals are being buffered, data transfer using TCP is halted, but this period equals the amount of time taken for the hand-off (approximately 100 ms or less). On the other hand, the time in which data transfer is halted due to successive TCP data segment loss equals the amount of time taken for a TCP retransmit timer to expire (equivalent to "Tr" in FIGS. 25 to 28, and at least one second, for example). Thus TCP throughput deterioration due to TCP acknowledgement signal buffering is smaller than TCP throughput deterioration due to successive TCP data segment loss. Hence a dramatic deterioration in TCP throughput during the hand-off of the mobile node can be prevented.

It is preferable that the period during which the TCP acknowledgement signals are buffered by the means is a period from a predetermined time before the beginning of a link layer disconnection period, during which the link layer of the mobile node is not connected to any external links in order to switch connection points, to the time following the end of the link layer disconnection period at which the access router providing the newly connected external link becomes the default router. With such a constitution, the TCP acknowledgement signal buffering period can be set highly appropriately and a deterioration in TCP throughput can be further prevented.

It is also preferable for the means to detect the predetermined time before the beginning of a link layer disconnection period by means of a signal from an interface which is connected to the external link, and for the means to detect a change in the default router by means of a signal from the IP layer of the mobile node. With such a constitution, a TCP acknowledgement signal buffering period can be detected appropriately and easily.

It is further preferable for the means to perform buffering of a TCP acknowledgement signal upon each TCP connection, and when, upon each TCP connection, a newly buffered TCP acknowledgement signal corresponds to a TCP data segment with a larger sequence number than the currently buffered TCP acknowledgement signal, it is preferable for the currently buffered TCP acknowledgement signal to be replaced by the newly buffered TCP acknowledgement signal With such a constitution, the space required for buffering TCP acknowledgement signals can be economized.

The mobile node may also transmit a TCP data segment, and the means may buffer this TCP data segment during the hand-off period and transmit the buffered TCP data segment to the access router providing the newly connected external link when the hand-off is complete.

In this mobile communication system, TCP data segments which were to be transmitted during the hand-off period are not transmitted during the hand-off period but are buffered. The buffered TCP data segments are transmitted to the access router providing the newly connected external link when the hand-off is complete. Thus, since TCP data segments are not transmitted during the hand-off period, no corresponding TCP acknowledgement signals are transmitted to the mobile node from the correspondent node and no TCP acknowledgement signals become subject to packet loss. When the TCP data segments are transmitted following the hand-off period, TCP acknowledgement signals corresponding to the transmitted TCP data segments are transmitted to the mobile node from the correspondent node. During the period in which the TCP data segments are buffered, data transfer using TCP is halted, but this period equals the amount of time taken for the hand-off (approximately 100 ms or less). On the other hand, the period in which data transfer is halted due to the inability to obtain an opportunity to transmit a TCP data segment equals the amount of time taken for a TCP retransmit timer to expire (equivalent to "Tr" in FIGS. 25 to 28, and at least one second, for example). Thus TCP throughput deterioration due to TCP data segment buffering is smaller than TCP throughput deterioration due to the inability to obtain an opportunity to transmit a TCP data segment. Hence a dramatic deterioration in TCP throughput during the hand-off of the mobile node can be prevented.

It is preferable that the period during which the TCP data segments are buffered by the means is a period from a predetermined time before the beginning of a link layer disconnection period during which the link layer of the mobile node is not connected to any external links in order to switch connection points to the time following the end of the link layer disconnection period at which the access router providing the newly connected external link becomes the default router. With such a constitution, the TCP data segment buffering period can be set highly appropriately and a deterioration in TCP throughput can be further prevented.

It is also preferable that the means detects the predetermined time before the beginning of a link layer disconnection period by means of a signal from an interface which is connected to the external link, and that the means detects a change in the default router by means of a signal from the IP layer of the mobile node. With such a constitution, the TCP data segment buffering period can be detected appropriately and easily.

In order to transmit a packet, a communication control program according to the present invention causes a computer to function as means for buffering the packet during a hand-off period and transmitting the buffered packet when the hand-off is complete, wherein the means is caused to determine the period during which the packet is buffered on the basis of the connection status of the link layer of the mobile node.

By having a computer function as this means in the communication control program according to the present invention, packets which were to be transmitted during the hand-off period are not transmitted during the hand-off period but are buffered, and these buffered packets are transmitted when the hand-off is complete. As a result, packet loss occurring during a hand-off period can be prevented.

It is preferable that the period during which packets are buffered by the means is a period from the beginning of a link layer disconnection period during which the link layer of the mobile node is not connected to any external links in order to switch connection points to the time following the end of the link layer disconnection period at which the access router providing the newly connected external link becomes the default router. With such a constitution, the packet buffering period can be set highly appropriately, whereby packet loss can be prevented with certainty.

It is also preferable that the means is caused to detect the beginning of the link layer disconnection period by a signal from an interface which is connected to the external link, and is caused to detect a change in the default router by a signal from the IP layer of the mobile node. With such a constitution, the packet buffering period can be detected appropriately and easily.

It is further preferable that the means is caused not to buffer a router solicitation for requesting transmission of a router advertisement from the access router. With such a constitution, a router solicitation transmitted by the mobile node reaches an access router, and thus the mobile node is able to receive a router advertisement more quickly.

In this communication control program, in order to receive a TCP data segment and transmit a TCP acknowledgement signal corresponding to the TCP data segment, the computer may also be caused to function as means for buffering the TCP acknowledgement signal during the hand-off period and transmitting the buffered TCP acknowledgement signal when the hand-off is complete.

By having the computer function as this means, TCP acknowledgement signals which were to be transmitted during the hand-off period are not transmitted during the hand-off period but are buffered. The buffered TCP acknowledgement signals are transmitted when the hand-off is complete. Thus, since TCP acknowledgement signals are not transmitted during a hand-off period, no new TCP data segments are transmitted to the mobile node and no TCP data segments become subject to packet loss. When the TCP acknowledgement signals are transmitted following the hand-off period, new TCP data segments are transmitted to the mobile node. During the period in which the TCP acknowledgement signals are being buffered, data transfer using TCP is halted, but this period equals the amount of time taken for the hand-off (approximately 100 ms or less). On the other hand, the period in which data transfer is halted due to successive TCP data segment loss equals the amount of time taken for a TCP retransmit timer to expire (equivalent to "Tr" in FIGS. 25 to 28, and at least one second, for example). Thus TCP throughput deterioration due to TCP acknowledgement signal buffering is smaller than TCP throughput deterioration due to successive TCP data segment loss. Hence a dramatic deterioration in TCP throughput during a hand-off of the mobile node can be prevented.

It is preferable that the period during which TCP acknowledgement signals are buffered by the means is a period from a predetermined time before the beginning of a link layer disconnection period during which the link layer of the mobile node is not connected to any external links in order to switch connection points, to the time following the end of the link layer disconnection period at which the access router providing the newly connected external link becomes the default router. With such a constitution, the TCP acknowledgement signal buffering period can be set highly appropriately and a dramatic deterioration in TCP throughput can be further prevented.

It is also preferable that the means is caused to detect the beginning of a link layer disconnection period by a signal from an interface which is connected to the external link, and is caused to detect a change in the default router by a signal from the IP layer of the mobile node. With such a constitution, the TCP acknowledgement signal buffering period can be detected appropriately and easily.

It is further preferable that the means is caused to perform buffering of the TCP acknowledgement signals upon each TCP connection such that when, upon each TCP connection, a newly buffered TCP acknowledgement signal corresponds to a TCP data segment with a larger sequence number than a currently buffered TCP acknowledgement signal, the currently buffered TCP acknowledgement signal is replaced by the newly buffered TCP acknowledgement signal. With such a constitution, the space required for buffering TCP acknowledgement signals can be economized.

In order to transmit a TCP data segment, this communication control program may also cause the computer to function as means for buffering the TCP data segment during the hand-off period and transmitting the buffered TCP data segment when the hand-off is complete.

By having the computer function as this means in this communication control program, TCP data segments which were to be buffered during the hand-off period are not transmitted during the hand-off period but are buffered. The buffered TCP data segments are transmitted when the hand-off is complete. Thus, since TCP data segments are not transmitted during the hand-off period, no corresponding TCP acknowledgement signals are transmitted to the mobile node and no TCP acknowledgement signals become subject to packet loss. When the TCP data segments are transmitted following the hand-off period, TCP acknowledgement signals corresponding to the transmitted TCP data segments are transmitted to the mobile node. During the period in which the TCP data segments are buffered, data transfer using TCP is halted, but this period equals the amount of time taken for the hand-off (approximately 100 ms or less). On the other hand, the period in which data transfer is halted due to the inability to obtain an opportunity to transmit a TCP data segment equals the amount of time taken for a TCP retransmit timer to expire (equivalent to "Tr" in FIGS. 25 to 28, and at least one second, for example). Thus TCP throughput deterioration due to TCP data segment buffering is smaller than TCP throughput deterioration due to the inability to obtain an opportunity to transmit a TCP data segment. Hence a dramatic deterioration in TCP throughput during the hand-off of the mobile node can be prevented.

It is preferable that the period during which TCP data segments are buffered by the means is a period from a predetermined time before the beginning of a link layer disconnection period during which the link layer of the mobile node is not connected to any external links in order to switch connection points, to the time following the end of the link layer disconnection period at which the access router providing the newly connected external link becomes the default router. With such a constitution, the TCP data segment buffering period can be set highly appropriately, and thus a dramatic deterioration in TCP throughput can be further prevented.

It is also preferable that the means is caused to detect the predetermined time prior to the beginning of a link layer disconnection period by a signal from an interface which is connected to the external link, and is caused to detect a change in the default router by a signal from the IP layer of the mobile node. With such a constitution, the TCP data segment buffering period may be detected appropriately and easily.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

First Embodiment

Figure 1:
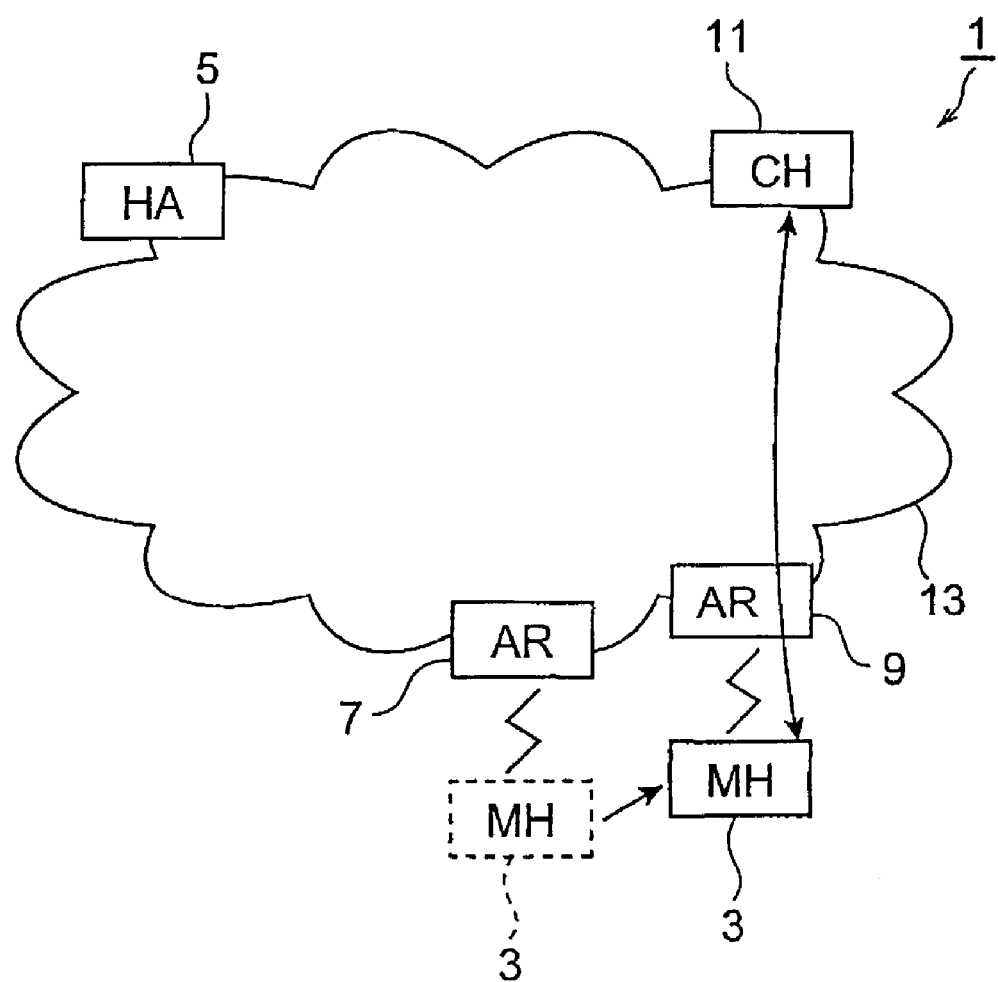
FIG. 1 is a view showing a constitution of a mobile communication system according to a first embodiment.

FIG. 1 is a view showing a constitution of a mobile communication system according to a first embodiment. In FIG. 1, MH indicates a mobile host, HA indicates a home agent, AR indicates an access router, and CH indicates a correspondent host.

As shown in FIG. 1, a mobile communication system 1 comprises a mobile host 3, a home agent 5, a plurality of access routers 7, 9, a correspondent host 11, and an IP network 13.

The mobile host 3 is a node which communicates with the correspondent host 11 while moving from link to link. The access routers 7, 9 are routers for providing external links (wireless links) to which the mobile host 3 can connect. The home agent 5 is a router capable of transferring packets addressed to the mobile host 3 to a link at which the mobile host 3 is located (an external link provided by an access router or the like) using the IP mobility control system Mobile IPv6 (Internet Protocol version 6). The correspondent host 11 is a node which communicates with the mobile host 3.

Note that a node is a device for transmitting and receiving packets corresponding to IPv6, and a link is a communication path for transmitting a packet transmitted from a node to another node by means of a wired transmission system or a wireless transmission system. Links comprise home links and external links. A home link is a link belonging to the mobile host 3, and an external link is a link other than a home link. The mobile host 3 is allocated a home address from a home link and allocated a care-of address from an external link.

Figure 2:
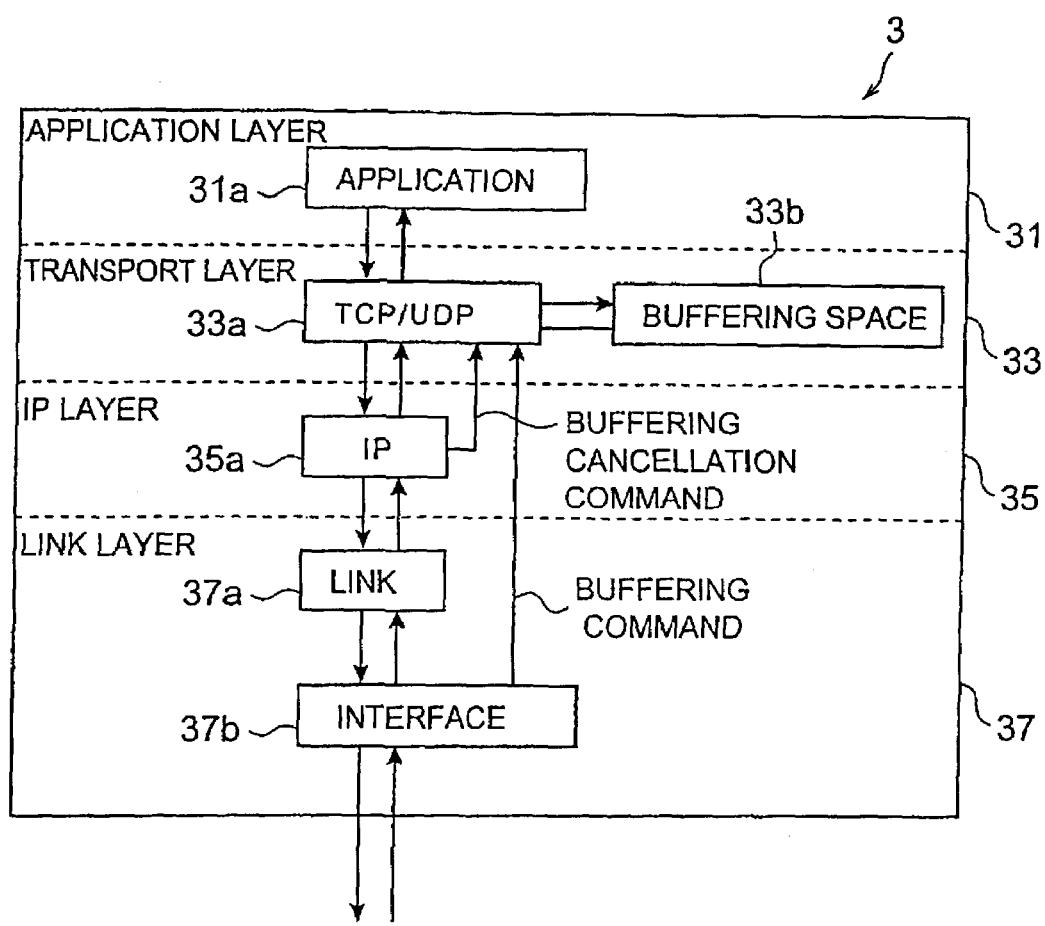
FIG. 2 is a view showing a constitution of a mobile host.

FIG. 2 is a view showing a constitution of the mobile host 3. The mobile host 3 is provided with an application layer 31 comprising an application 31a, a transport layer 33 comprising a TCP (Transmission Control Protocol) and UDP (User Datagram Protocol) 33a (to be referred to as "TCP/UDP" hereinafter) and a buffering space 33b, an IP layer 35 comprising an IP (Internet Protocol) 35a, and a link layer 37 comprising a link 37a and an interface 37b.

In the mobile host 3, data to be transmitted from the application 31a to another host are transmitted from the interface 37b via the TCP/UDP 33a, the IP 35a, and the link 37a. Conversely, data transmitted from another host reach the application 31a via the interface 37b, the link 37a, the IP 35a, and the TCP/UDP 33a.

The buffering space 33b is used for buffering a packet during a hand-off period. The TCP/UDP 33a buffers the packet into the buffering space 33b. The packet buffering period is a period required for switching connection points which extends from the beginning of a link layer 37 disconnection period, during which the link layer 37 of the mobile host 3 is not connected to any external links, to the point at which an access router providing a newly connected external link is switched to a default router following the end of the link layer 37 disconnection period. Here, the TCP/UDP 33a detects the beginning of the link layer 37 disconnection period by means of a signal from the interface 37b, and detects the change of default router by means of a signal from the IP 35a.

When the connection point is switched from the access router 7 to the access router 9, the interface 37b issues a buffering command to the TCP/UDP 33a. Thereby, the TCP/UDP 33a detects the beginning of the link layer 37 disconnection period. Having received the buffering command, the TCP/UDP 33a uses the buffering space 33b to begin buffering of the packets which were originally intended for transmission to the IP 35a.

Once the default router has been changed following a router advertisement received from the access router 9, the IP 35a issues a buffering cancellation command to the TCP/UDP 33a. Thereby, the TCP/UDP 33a detects that the default router has changed. Having received the buffering cancellation command, the TCP/UDP 33a cancels buffering and transmits the packets that were buffered in the buffering space 33b to the IP 35a. As noted above, the packets transferred to the IP 35a are transmitted via the link 37a to the interface 37b, and from the interface 37b to the access router 9 (set as the default router) which provides the newly connected external link.

Figure 3:
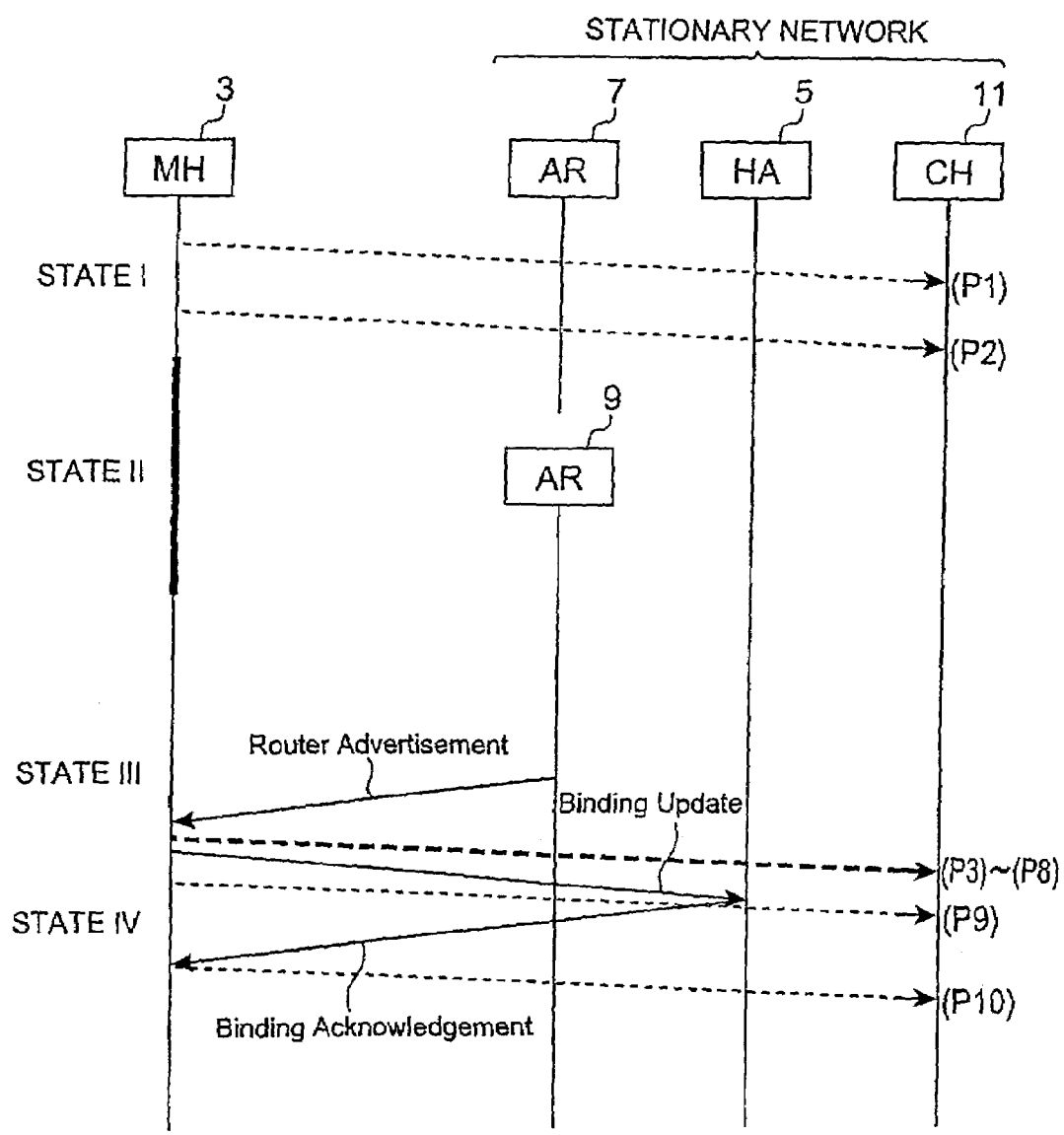
FIG. 3 is a sequence chart for a case in which the mobile host hands off during communication with a correspondent host.
Figure 23:
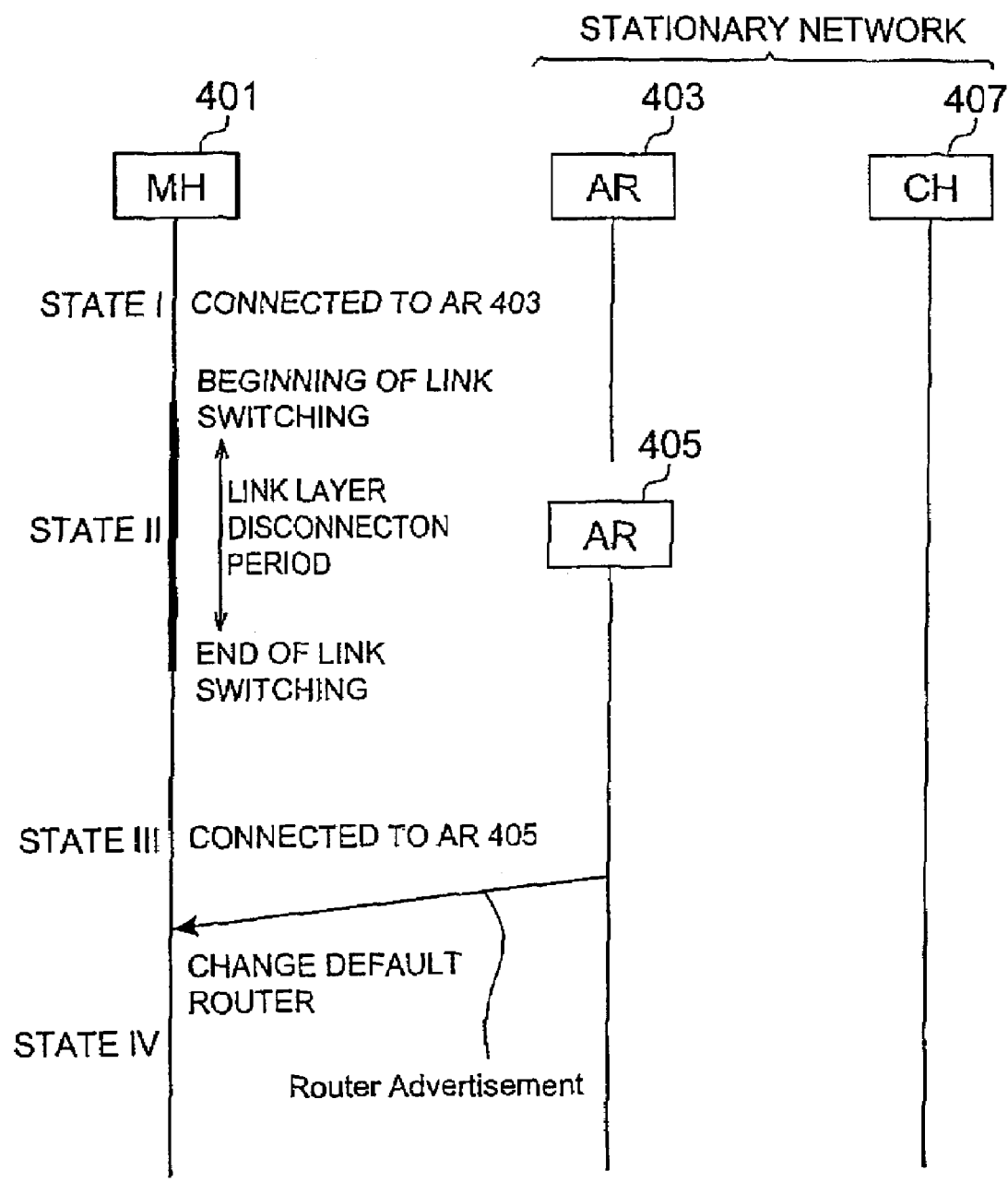
FIG. 23 is a sequence chart showing state transitions of a conventional mobile host during a hand-off.

FIG. 3 is a sequence chart for a case in which the mobile host 3 which is in communication with the correspondent host 11 hands off from the access holder 7 to the access holder 9. The solid line arrows represent control packets for executing a hand off at the IP layer level using Mobile IPv6, and the broken line arrows represent data packets transmitted by the mobile host 3 to the correspondent host 11. States I through IV in FIG. 3 correspond to the states I through IV as described in FIG. 23.

In state I, the link layer 37 of the mobile host 3 is connected to the access router 7, and the default router is set to the access router 7, and thus data packets (P1) and (P2) reach the access router 7 and are routed to the correspondent host 11. Then, in state II and state III, data packets (P3) to (P8) are buffered and not transmitted.

When the mobile host 3 receives a router advertisement from the access router 9 and alters the default router from the access router 7 to the access router 9, processing moves to state IV and the buffered data packets (P3) to (P8) are transmitted. Since the link layer 37 of the mobile host 3 is connected to the access router 9 and the default router is set to the access router 9, the data packets (P3) to (P8) are routed to the correspondent host 11 through the access router 9. Data packets (P9) and (P10) are also routed to the correspondent host 11 through the access router 9.

Note that when the mobile host 3 obtains a new care-of address used for an external link, the mobile host 3 transmits a packet containing a binding update option to the home agent 5. Having received the binding update packet, the home agent 5 stores the binding (the correspondence between the home address and care-of address of the mobile host 3) and transmits a packet containing a binding acknowledgement option to the mobile host 3 as a confirmation response.

In this first embodiment, it is assumed for the sake of simplicity that the mobile host 3 does not transmit a router solicitation. This embodiment is of course applicable to a mobile host 3 which transmits a router solicitation, but it is necessary to prevent the router solicitation from being buffered. If buffering is performed in the transport layer 33, as in the first embodiment, the router solicitation is not buffered.

Buffering may also be performed in the IP layer 35, but in this case it is necessary to determine whether or not the packet subject to buffering is a router solicitation by having the IP layer 35 analyze the IP header and below of the packet, and to exclude the packet from buffering if the packet is a router solicitation. Specifically, analysis of the IP header and below of the packet involves the following operation. For each packet, the IP layer 35 checks the protocol number stored in the next header field in each IP header comprising an extension header, and if the protocol number indicates 58 (icmp), the IP layer 35 checks the field indicating the type of the icmp following the IP header. If the type number is 133 (a router solicitation), it is determined that the packet is a router solicitation.

Note that in this first embodiment, the packet buffering period is set as a period from the beginning of the link layer 37 disconnection period, during which the link layer 37 of the mobile host 3 is not connected to any external links in order to switch connection points, to the point at which the access router providing the newly connected external link becomes the default router following the end of the link layer 37 disconnection period. However, the packet buffering period is not limited thereto, and may, for example, be set longer than this period in consideration of the wireless link conditions and so on.

As described above, during a hand-off period in the first embodiment, while packets cannot be transmitted to either of the access routers 7, 9 from the mobile host 3, the mobile host 3 buffers the packets to be transmitted during the hand-off period, and transmits the buffered packets when the packets become able to reach the hand-off destination access router 9. As a result, all of the packets that were to be transmitted by the mobile host 3 during the hand-off are routed to the correspondent host 11 via the hand-off destination access router 9, and thus the occurrence of packet loss during a hand-off period can be prevented.

Also in the first embodiment, the period during which the mobile host 3 buffers packets is set as a period from the beginning of the link layer 37 disconnection period, during which the link layer 37 of the mobile host 3 is not connected to any external links in order to switch connection points, to the point at which the access router 9 providing the newly connected external link becomes the default router following the end of the link layer 37 disconnection period. Hence the packet buffering period can be set highly appropriately so that packet loss is prevented with certainty.

Also according to the first embodiment, the beginning of a link layer 37 disconnection period is detected in the TCP/UDP 33a by means of a signal from the interface 37b which is connected to the external link, and a change in default router is detected in the TCP/UDP 33a by means of a signal from the IP layer 35 of the mobile host 3. Thus the packet buffering period can be detected appropriately and easily.

It should be noted that if all packets are buffered in the mobile host 3 which transmits a router solicitation, the following problem arises. It is generally preferable that the mobile host 3 receives a router advertisement as early as possible in order to learn the default router more quickly. Hence, the mobile host 3 is capable of transmitting a router solicitation to an access router directly after the end of link connection point alteration using a multicast addressed to all of the routers on a link. However, when all packets are buffered, the router solicitation does not reach the access routers 9, and as a result, reception in the mobile host 3 of a router advertisement is delayed. If router solicitations are not buffered, then a router solicitation transmitted by the mobile host 3 reaches the access routers 9 and the mobile host 3 is able to receive a router advertisement more quickly.

Second Embodiment

Figure 4:
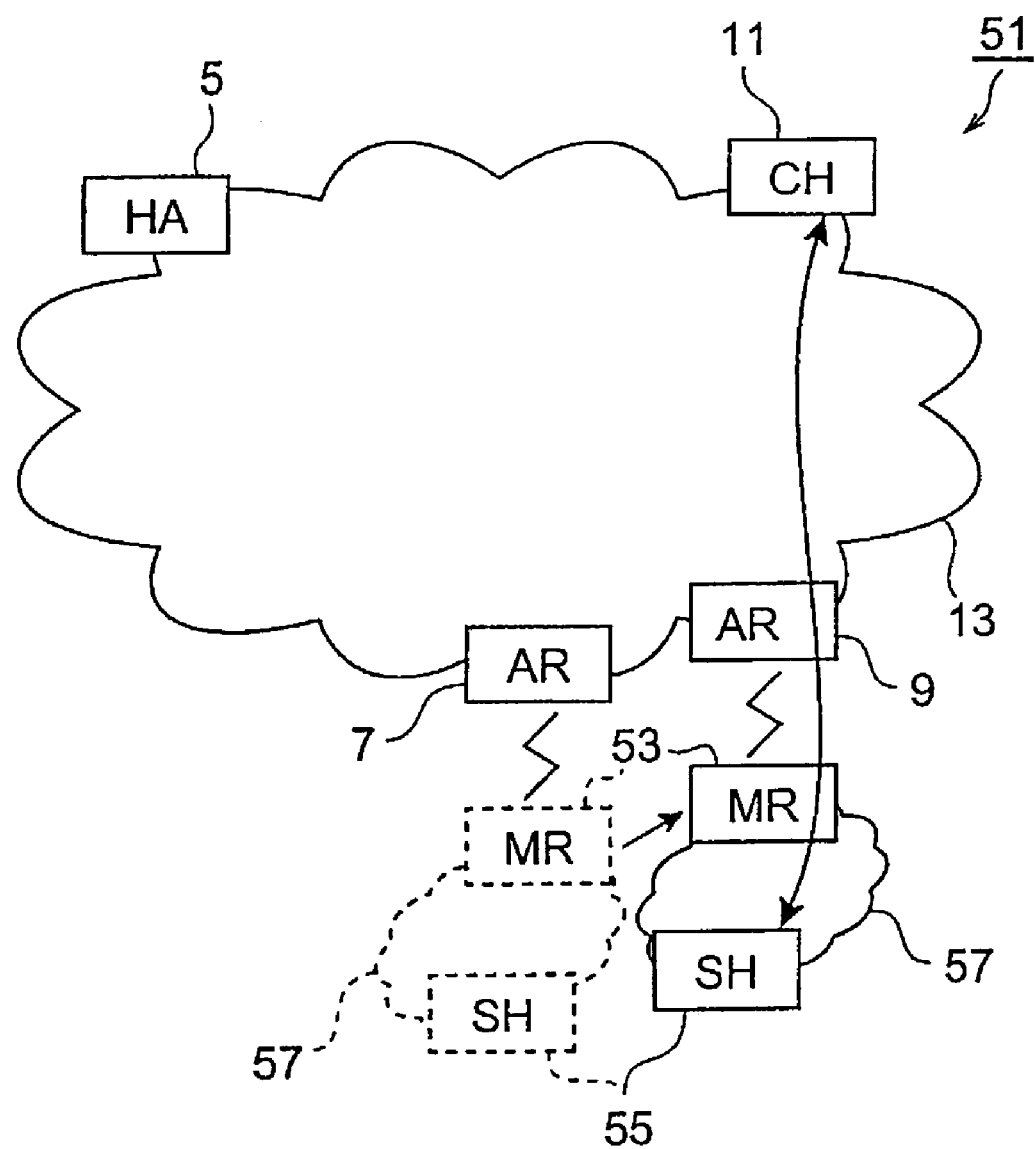
FIG. 4 is a view showing a constitution of a mobile communication system according to a second embodiment.

FIG. 4 is a view showing the constitution of a mobile communication system according to a second embodiment. In FIG. 4, SH indicates a stationary host, MR indicates a mobile router, HA indicates a home agent, AR indicates an access router, and CH indicates a correspondent host.

As shown in FIG. 4, a mobile communication system 51 comprises a mobile router 53, a stationary host 55, the home agent 5, the plurality of access routers 7, 9, the correspondent host 11, and the IP network 13.

The mobile router 53 moves from link to link with a mobile network 57 comprising the stationary host 55, and functions as a gateway router for the mobile network 57. The mobile router 53 uses a home address on a home link, and on an external link uses the home address and a care-of address having a link prefix for each link. The stationary host 55 is a node having an unchanging connection relationship with the mobile router 55. Note that the mobile network 57 may also comprise a router or a mobile host. The home agent 5 provides the mobile router 53 with a home link, and the access routers provide the mobile router 53 with external links.

The mobile router 53 informs the home agent 5 of binding comprising the home address of this node, the network prefixes within the mobile network 57, and a care-of address obtained by a connection link, and the home agent 5 stores this binding. Having received a packet addressed to the home address of the mobile router 53 or to an address belonging to a network prefix in the mobile network 57, the home agent 5 creates an IP packet addressed to the bound care-of address, stores this packet in a payload portion, and forwards the packet to the mobile router 53. Having received the forwarded packet, the mobile router 53 extracts the original packet from the payload portion, and if the packet is addressed to a host existing within the mobile network 57, routes the packet within the mobile network 57.

Figure 5:
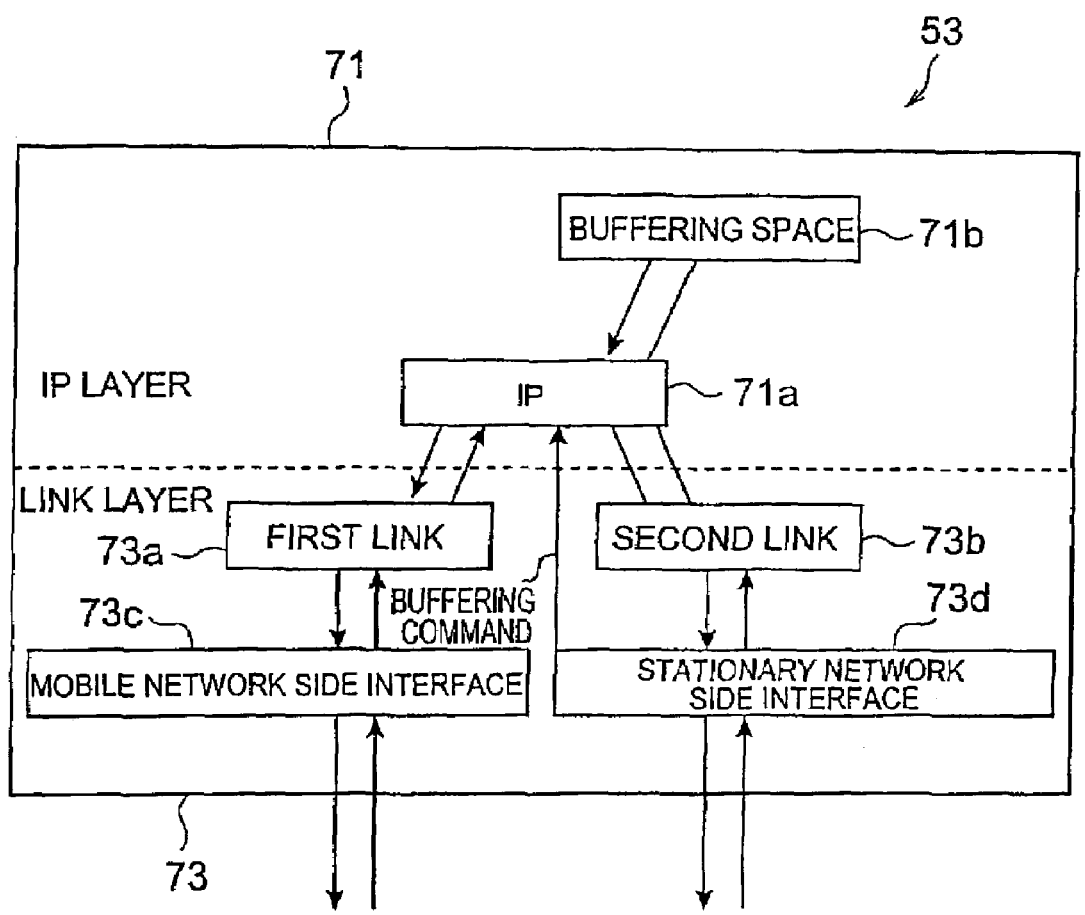
FIG. 5 is a view showing a constitution of a mobile router.

FIG. 5 is a view showing the constitution of the mobile router. The mobile router is provided with an IP layer 71 comprising an IP 71a and a buffering space 71b, and a link layer 73 comprising a first link 73a, a second link 73b, a mobile network side interface 73c, and a stationary network side interface 73d.

Packets received from the mobile network side interface 73c or the stationary network side interface 73d reach the IP 71a through the first link 73a and second link 73b respectively. The IP 71a references a routing table to determine whether to transmit the packets to the stationary network side (default router) or the mobile network 57 side (stationary host 55), and transfers the packets to the second link 73b or the first link 73a in accordance with the result of this determination.

The buffering space 71b is used for buffering packets during a hand-off period. The IP 71a buffers packets into the buffering space 71b. The packet buffering period is set as a period from the beginning of a link layer (second link 73b and stationary network side interface 73d) disconnection period, during which the second link 73b and stationary network side interface 73d of the link layer 73 in the mobile router 53 are not connected to any external links in order to switch connection points, to the point at which the access router 9 providing a newly connected external link becomes the default router following the end of the link layer (second link 73b and stationary network side interface 73d) disconnection period. Here, the IP 71a detects the beginning of the link layer (second link 73b and stationary network side interface 73d) disconnection period by means of a signal from the stationary network side interface 73d, and detects a change in default router itself.

The stationary network side interface 73d issues a buffering command to the IP 71a when the connection point is switched from the access router 7 to the access router 9. Thereby the IP 71a detects the beginning of a link layer (second link 73b and stationary network side interface 73d) disconnection period. Having received the buffering command, the IP 71a uses the buffering space 71b to begin buffering the packets which were originally due to be transmitted to the second link 73b.

Once the default router has been changed following a router advertisement received from the access router 9, the IP 71a itself detects that the default router has changed and cancels buffering. The IP 71a then transmits the packets that were buffered in the buffering space 71b to the second link 73b. As noted above, the packets transferred to the second link 73b are transmitted from the stationary network side interface 73b to the access router 9 (set as the default router) providing the newly connected external link.

Figure 6:
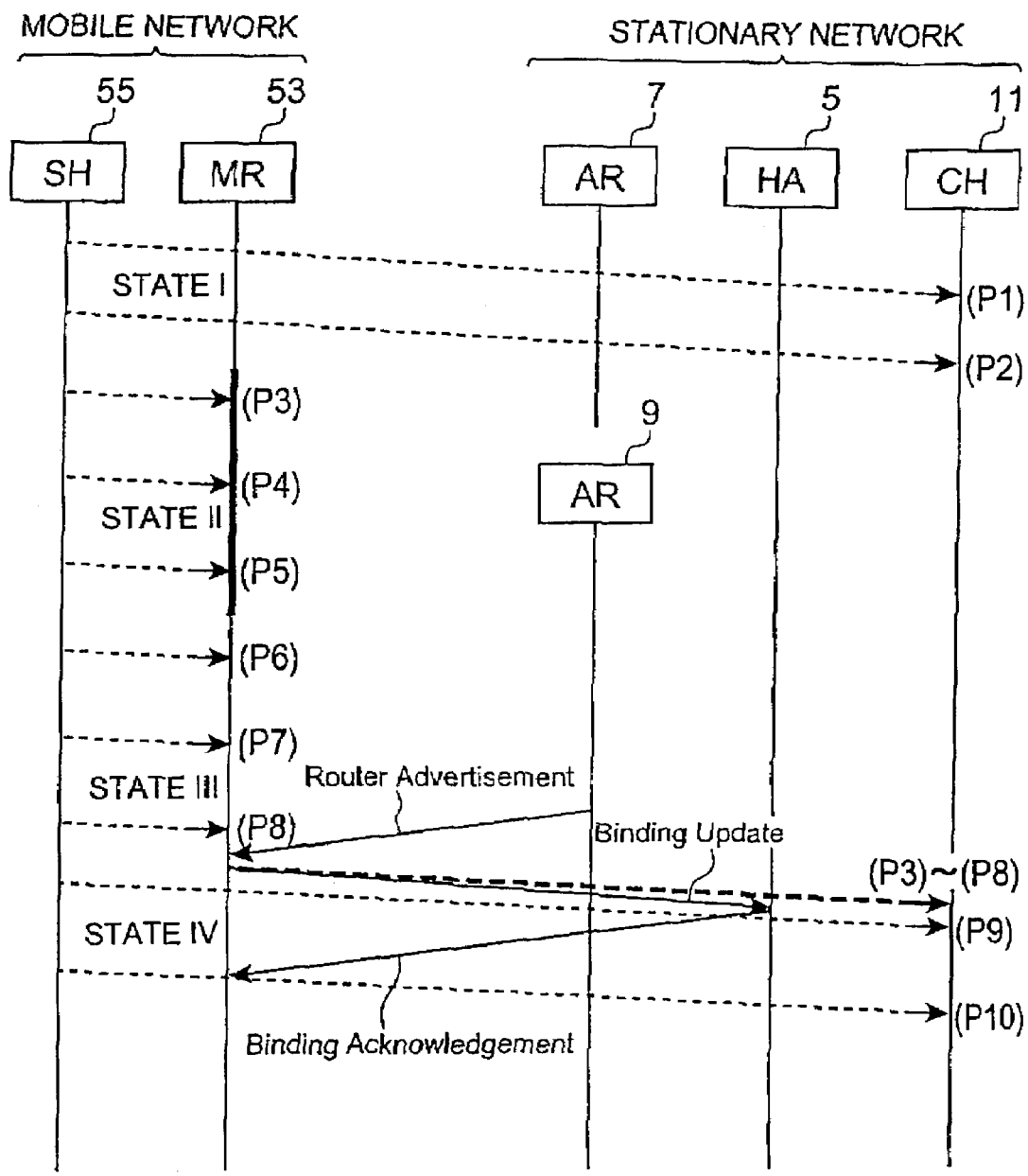
FIG. 6 is a sequence chart for a case in which the mobile router hands off during communication with a correspondent host.
Figure 24:
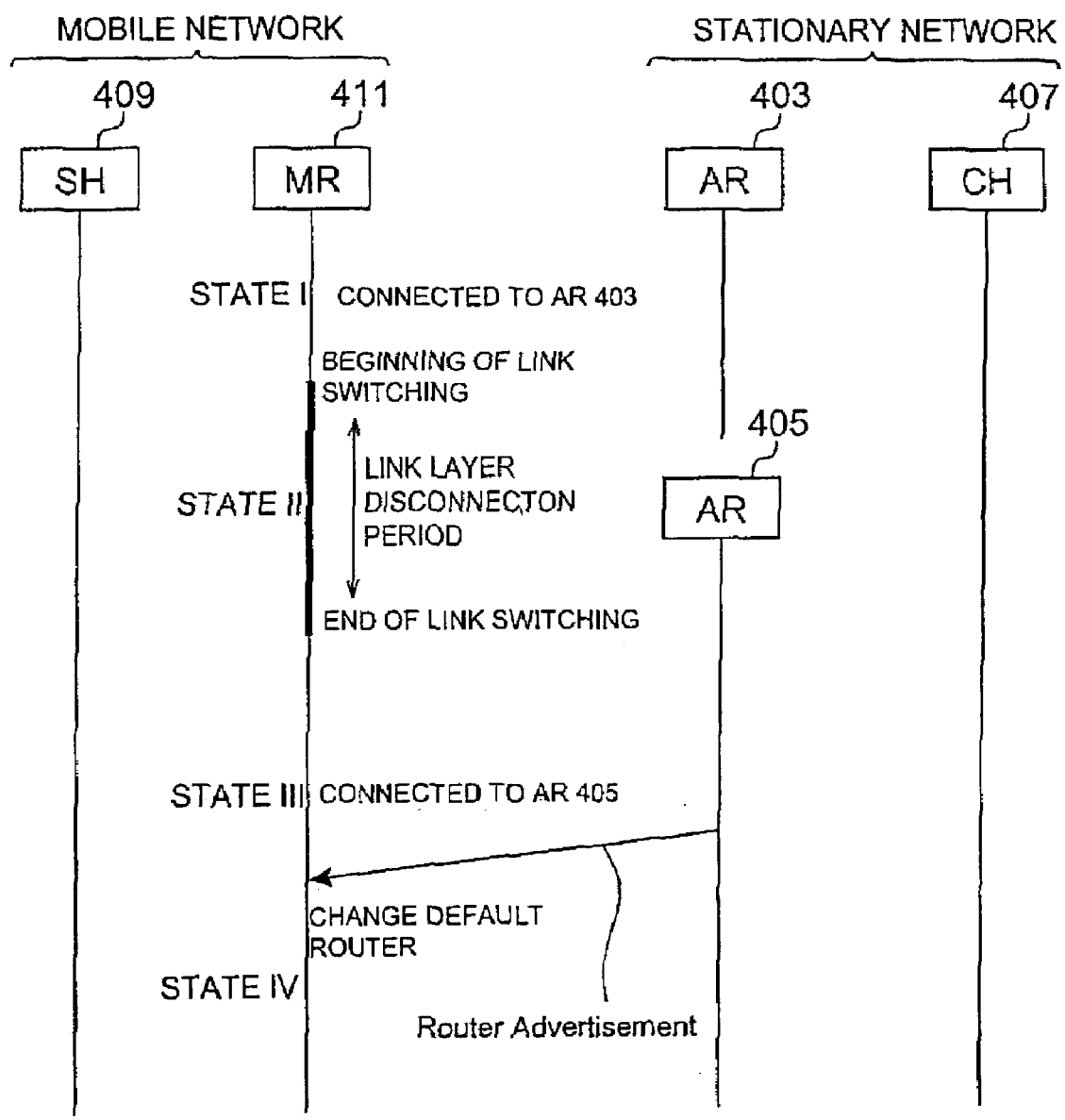
FIG. 24 is a sequence chart showing state transitions of a conventional mobile router during a hand-off.
Figure 25:
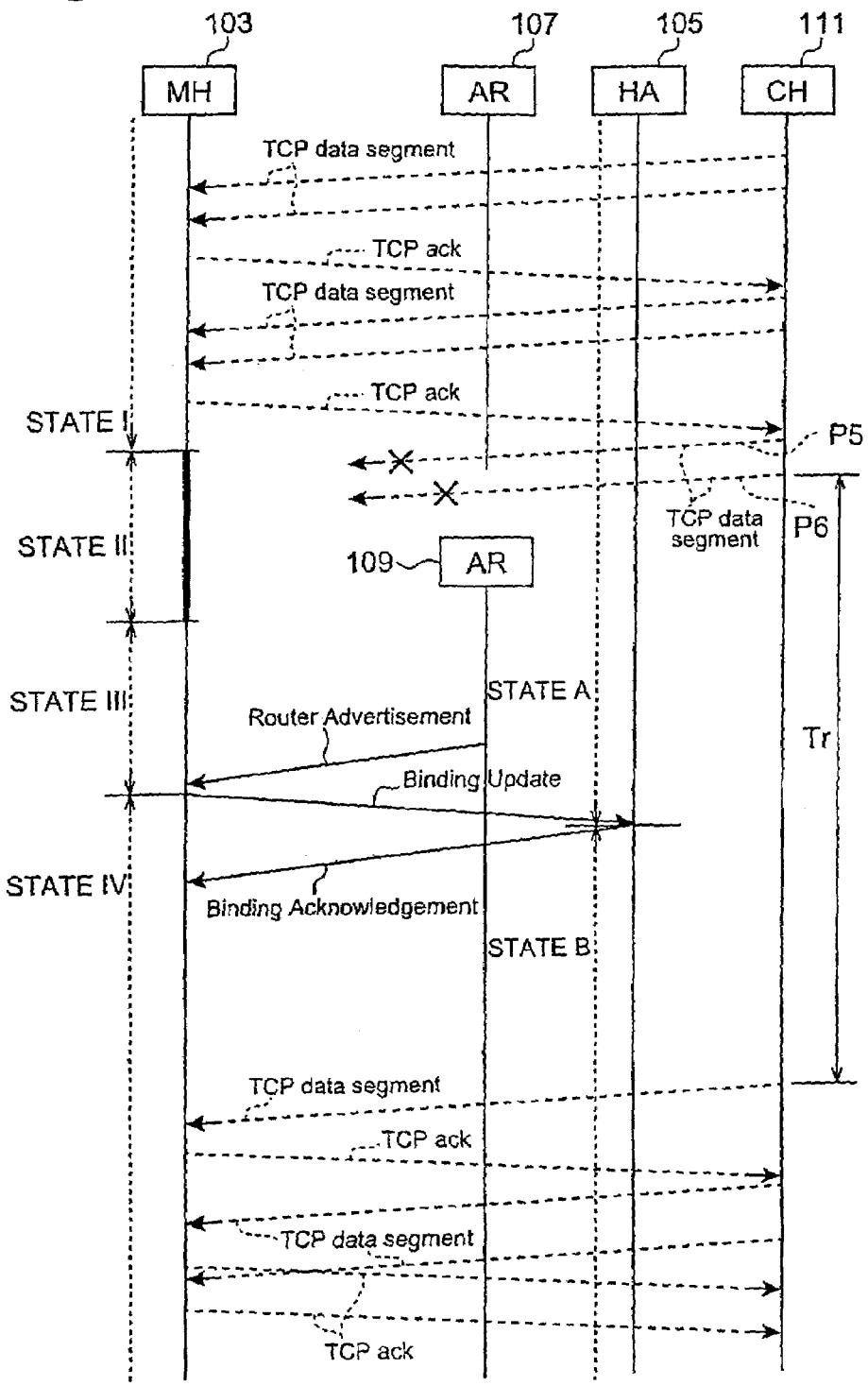
FIG. 25 is a sequence chart of a hand-off by the conventional mobile host during reception of data transfer from a correspondent host using TCP.
Figure 26:
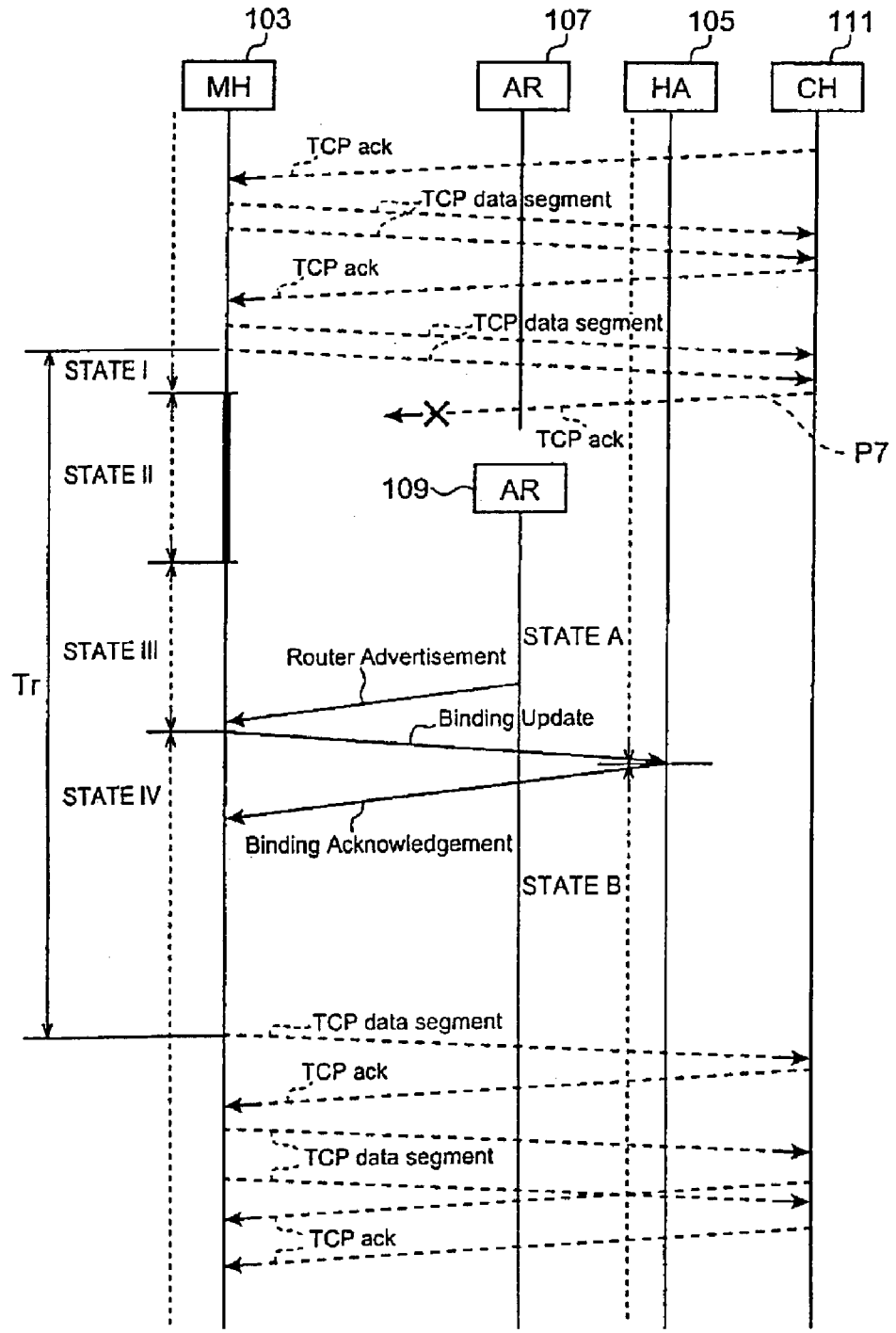
FIG. 26 is a sequence chart of a hand-off by a conventional mobile host during the transfer of data using TCP to a correspondent host.
Figure 27:
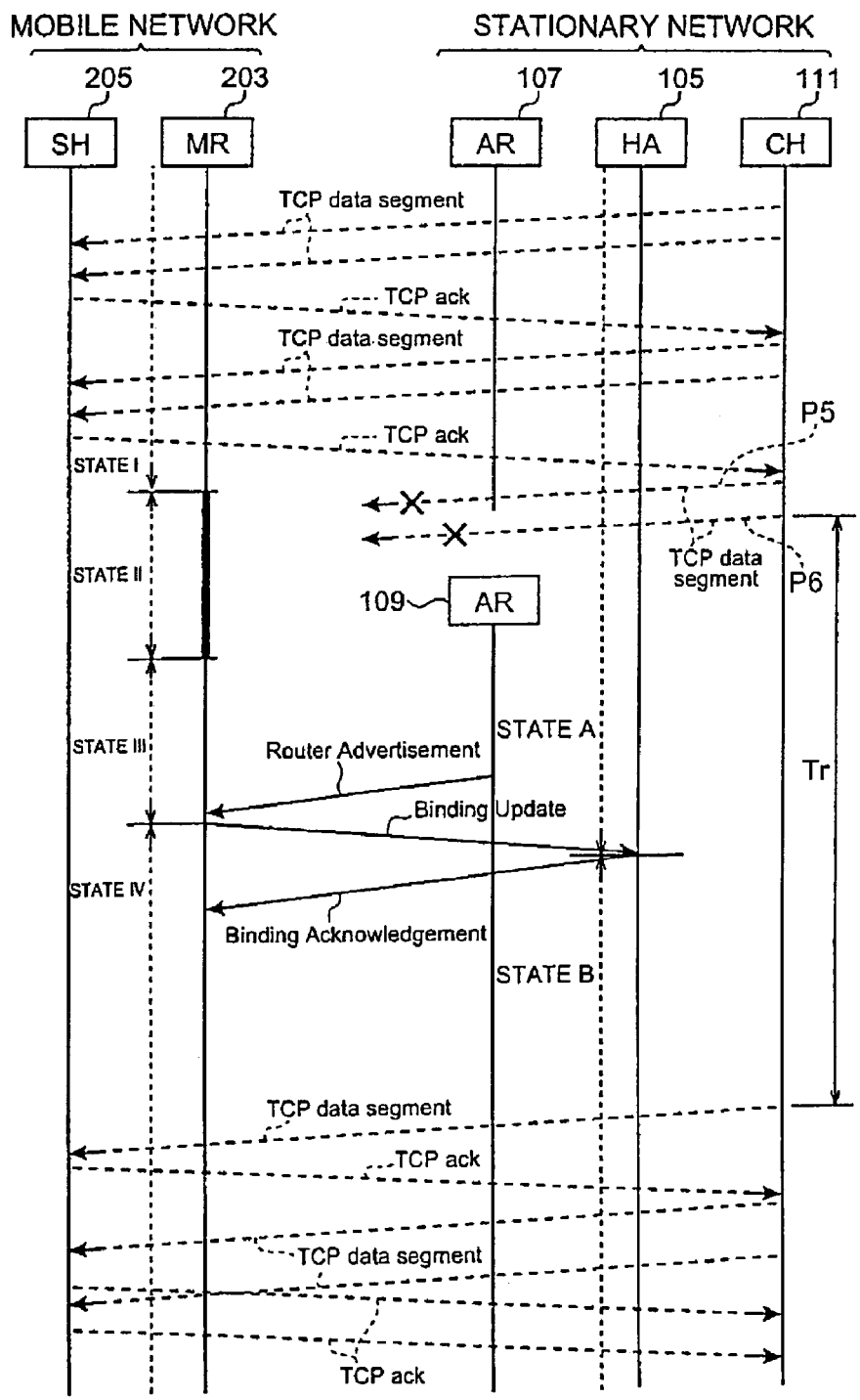
FIG. 27 is a sequence chart of a hand-off performed by a conventional mobile router while data transfer using TCP is received by a stationary host in a mobile network from a correspondent host.
Figure 28:
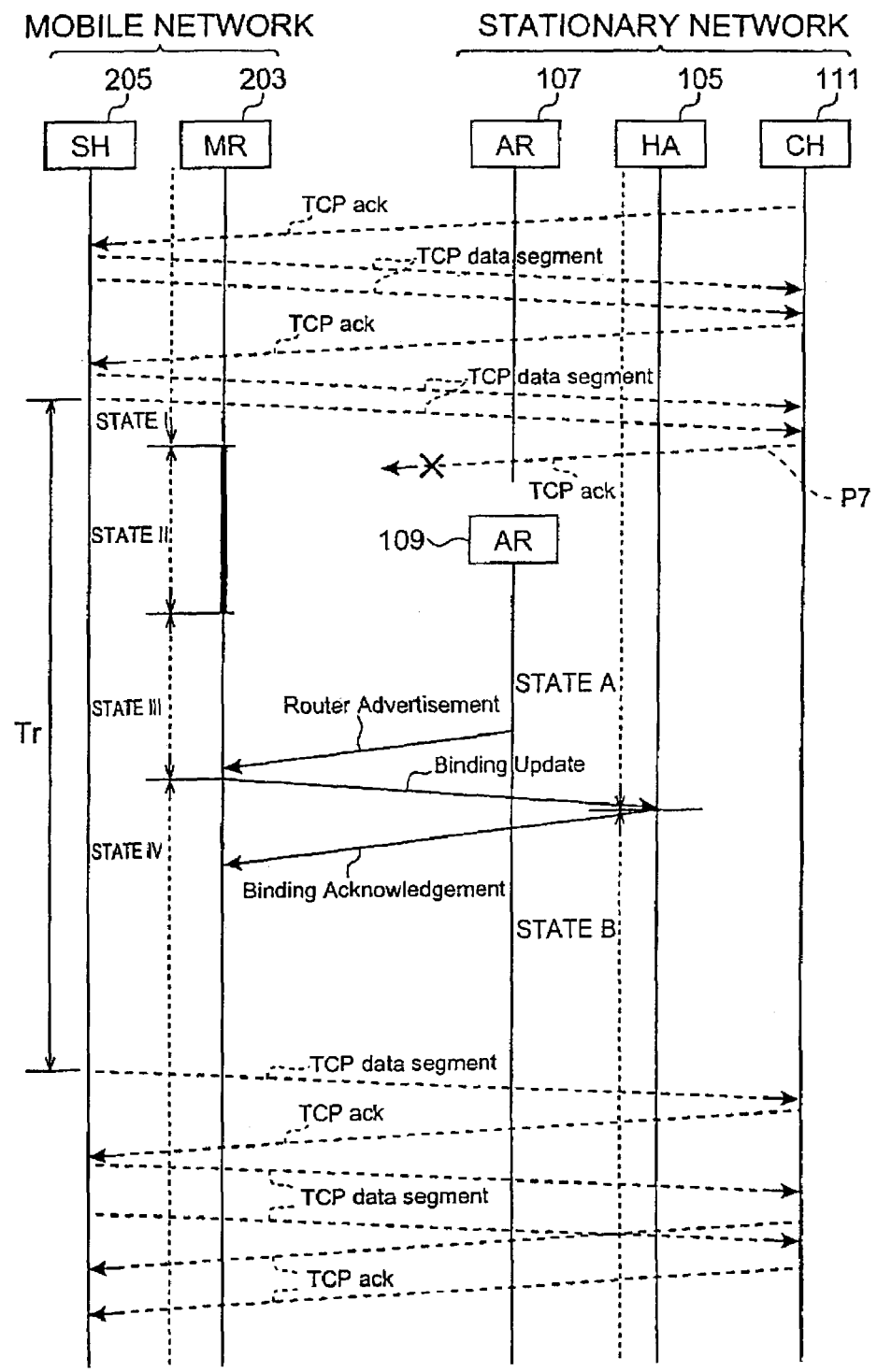
FIG. 28 is a sequence chart of a hand-off performed by a conventional mobile router while data transfer using TCP is performed from a stationary host in a mobile network to a correspondent host.

FIG. 6 is a sequence chart for a case in which the mobile router 53 which is in communication with the correspondent host 11 hands off from the access router 7 to the access router 9. The solid line arrows represent control packets for executing a hand off, and the broken line arrows represent data packets transmitted by the mobile router 53 to the correspondent host 11. States I through IV in FIG. 6 correspond to the states I through IV to be described in FIG. 24.

In state I, the link layer 73 (second link 73b and stationary network side interface 73d) of the mobile router 53 is connected to the access router 7, and the default router is set to the access router 7, and thus data packets (P1) and (P2) reach the access router 7 and are routed to the correspondent host 11. Then, in state II and state III, data packets (P3) to (P8) are buffered rather than being transmitted.

When the mobile router 53 receives a router advertisement from the access router 9 and alters the default router from the access router 7 to the access router 9, processing moves to state IV and the buffered data packets (P3) to (P8) are transmitted. Since the link layer 73 (second link 73b and stationary network side interface 73d) of the mobile router 53 is connected to the access router 9 and the default router is set to the access router 9, the data packets (P3) to (P8) are routed to the correspondent host 11 through the access router 9. Data packets (P9) and (P10) are also routed to the correspondent host 11 through the access router 9.

Note that when the mobile router 53 obtains a new care-of address for use on an external link, the mobile router 53 transmits a packet containing a binding update option to the home agent 5. Having received the binding update packet, the home agent 5 stores the binding (the correspondence between the home address and care-of address of the mobile router 53) and transmits a packet containing a binding acknowledgement option to the mobile router 53 as a confirmation response.

In this second embodiment, it is assumed for the sake of simplicity that the mobile router 53 does not transmit a router solicitation. This embodiment is of course applicable to a mobile router 53 which transmits a router solicitation, but it is necessary to prevent the router solicitation from being buffered. When buffering is performed in the IP layer 71, a determination is made as to whether or not the packet subject to buffering is a router solicitation by having the IP layer 71 analyze the IP header and below of the packet, and if the packet is a router solicitation, then the router solicitation must be excluded from the buffering subjects. Analysis of the IP header and below of the packet specifically involves the following operation. For each packet, the IP layer 71 checks the protocol number stored in the next header field in each IP header comprising an extension header, and when the protocol number indicates 58 (icmp), the IP layer 71 checks the field indicating the type of the icmp following the IP header. If the type number is 133 (a router solicitation), it is determined that the packet is a router solicitation.

In this second embodiment, the packet buffering period is set as a period from the beginning of a link layer (second link 73b and stationary network side interface 73d) disconnection period, during which the second link 73b and stationary network side interface 73d of the link layer 73 in the mobile router 53 are not connected to any external links in order to switch connection points, to the time at which the access router 9 providing the newly connected external link following the end of the link layer (second link 73b and stationary network side interface, 73d) disconnection period becomes the default router. However, the packet buffering period is not limited thereto, and may, for example, be set longer than this period in consideration of the wireless link conditions and so on.

As described above, during a hand-off period in the second embodiment, while packets cannot be transmitted to either of the access routers 7, 9 from the mobile router 53, the mobile router 53 buffers the packets to be transmitted during the hand-off period and transmits the buffered packets when the packets become able to reach the hand-off destination access router 9. As a result, all of the packets that were to be routed to the stationary network side by the mobile router 53 during the hand-off are routed to the correspondent host 11 via the hand-off destination access router 9, and thus the occurrence of packet loss during a hand-off period can be prevented.

Further, in the second embodiment the packet buffering period by the mobile router 53 is set as a period from the beginning of the link layer (second link 73b and stationary network side interface 73d) disconnection period, during which the second link 73b and stationary network side interface 73d of the link layer 73 in the mobile router 53 are not connected to any external links in order to switch connection points, to the time at which the access router 9 providing the newly connected external link following the end of the link layer (second link 73b and stationary network side interface 73d) disconnection period becomes the default router. Hence the packet buffering period can be set highly appropriately so that packet loss is prevented with certainty.

Also according to the second embodiment, the beginning of a link layer (second link 73b and stationary network side interface 73d) disconnection period is detected in the IP 71a by means of a signal from the stationary network side interface 73d which is connected to an external link, and a change in default router is detected by the IP 71a itself. Thus the packet buffering period can be detected appropriately and easily.

Note that it is preferable for a router solicitation not to be buffered in the mobile router 53 which transmits router solicitations. In so doing, a router solicitation transmitted by the mobile router 53 reaches the access routers 9, and as a result the mobile router 53 is able to receive a router advertisement more quickly.

Third Embodiment

Figure 7:
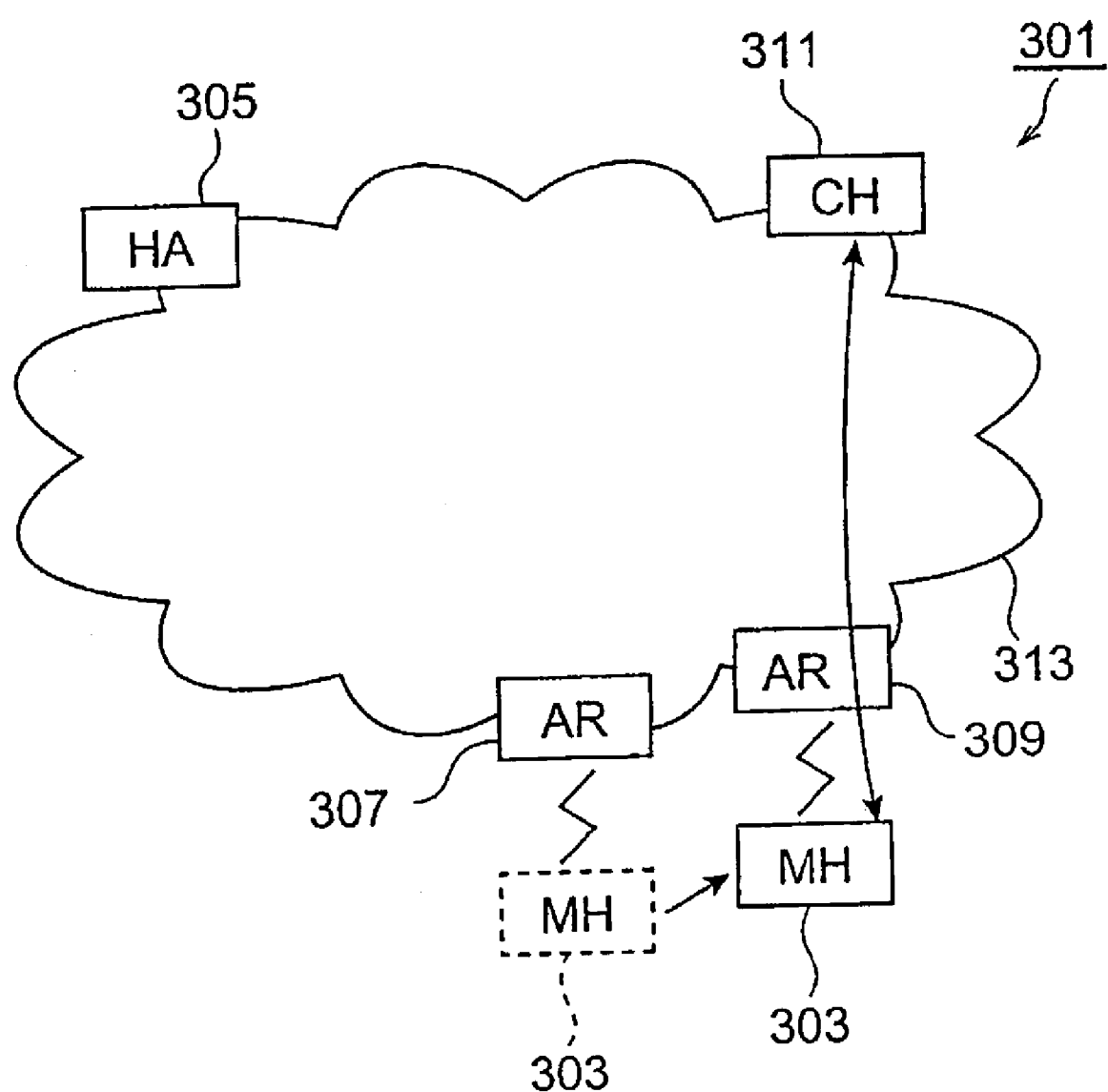
FIG. 7 is a view showing a constitution of a mobile communication system according to a third embodiment.

FIG. 7 is a view showing a constitution of a mobile communication system according to a third embodiment. In FIG. 7, MH indicates a mobile host, HA indicates a home agent, AR indicates an access router, and CH indicates a correspondent host.

As shown in FIG. 7, a mobile communication system 301 comprises a mobile host 303, a home agent 305, a plurality of access routers 307, 309, a correspondent host 311, and an IP network 313.

The mobile host 303 is a node which communicates with the correspondent host 311 while moving from link to link. The access routers 307, 309 are routers for providing external links to which the mobile host 303 can connect. The home agent 305 is a router capable of transferring a packet addressed to the mobile host 303 to a link at which the mobile host 303 is located (an external link provided by an access router or the like) using the IP mobility control system Mobile IPv6 (Internet Protocol version 6). The correspondent host 311 is a node which communicates with the mobile host 303.

A node is a device for transmitting and receiving (including routing) packets corresponding to IPv6, and a link is a communication path for transmitting a packet transmitted from a node to another node by means of a wired transmission system or a wireless transmission system. Links comprise home links and external links. A home link is a link belonging to the mobile host 303, and an external link is a link other than a home link. The mobile host 303 is allocated a home address from a home link and is allocated a care-of address from an external link.

The mobile host 303 uses a home address on a home link and on an external link uses the home address and a care-of address having a link prefix for each external link. The mobile host 303 informs the home agent 305 of binding comprising "the home address of this node" and a "care-of address obtained by a connection link", and the home agent 305 stores this binding. Having received a packet addressed to the home address of the mobile host 303, the home agent 305 creates an IP packet addressed to the bound care-of address, stores this packet in a payload portion, and forwards the packet to the mobile host 303. Having received the forwarded packet, the mobile host 303 extracts the original packet from the payload portion. Since the internal packet is addressed to the mobile host 303, this may be transmitted.

Figure 8:
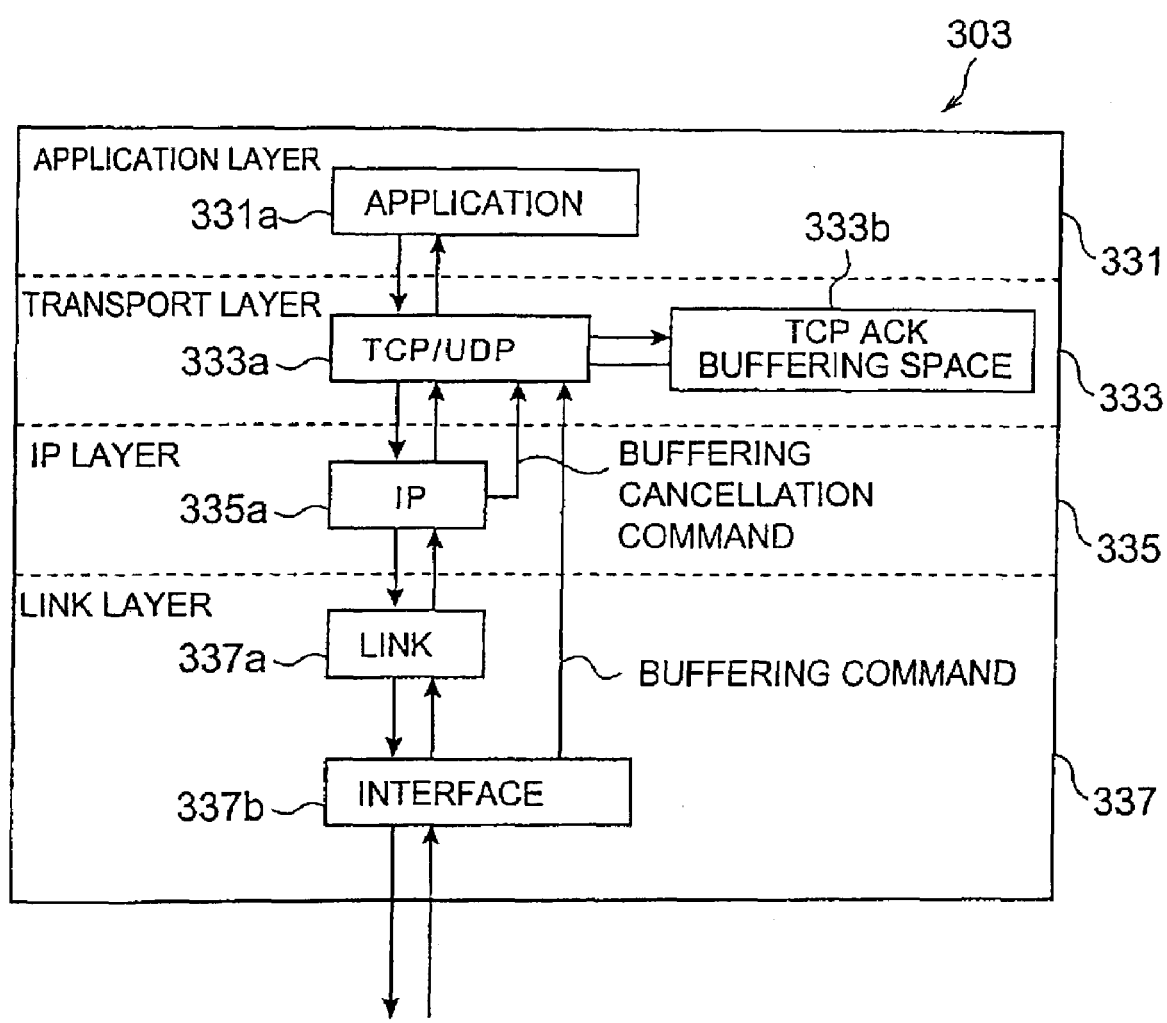
FIG. 8 is a view showing a constitution of a mobile host.

FIG. 8 is a view showing a constitution of the mobile host 303. The mobile host 303 is provided with an application layer 331 comprising an application 331a, a transport layer 333 comprising a TCP (Transmission Control Protocol) and UDP (User Datagram Protocol) 333a (to be referred to as "TCP/UDP" hereinafter) and a TCP ack buffering space 333b, an IP layer 335 comprising an IP (Internet Protocol) 335a, and a link layer 337 comprising a link 337a and an interface 337b.

In the mobile host 303, data generated by the application 331a are transmitted from the interface 337b via the TCP/UDP 333a, the IP 335a, and the link 337a. Packets received from the interface 337b reach the application 331a via the link 337a, the IP 335a, and the TCP/UDP 333a.

The TCP ack buffering space 333b is used for buffering TCP acks during a hand-off period. The TCP/UDP 333a buffers the TCP acks into the TCP ack buffering space. The TCP ack buffering period is a period which extends from a predetermined time (Tn) before the beginning of a link layer 337 disconnection period required for switching connection points, when the link layer 337 of the mobile host 303 is not connected to any external links, to the point at which the access router providing the newly connected external link becomes the default router following the end of the link layer 337 disconnection period. Here, the TCP/UDP 333a detects the predetermined time (Tn) before the beginning of the link layer 337 disconnection period by means of a signal from the interface 337b, and detects a change in default router by means of a signal from the IP 335a. Here, the range of the predetermined time (Tn) begins from zero. Here, the predetermined time (Tn) is preferably set equal to or greater than the round trip time between the mobile host and the correspondent host, or in other words the time in which a TCP data segment newly transmitted by the correspondent host in response to the reception by the correspondent host of the last transmitted TCP ack prior to the beginning of buffering can be received via the currently connected access router.

When the connection point is switched from the access router 307 to the access router 309, the interface 337b issues a buffering command to the TCP/UDP 333a. Thereby, the TCP/UDP 333a detects the predetermined time (Tn) before the beginning of the link layer 337 disconnection period. Having received the buffering command, the TCP/UDP 333a uses the TCP ack buffering space 333b to begin buffering the TCP acks which were originally intended for transmission to the IP 335a.

Once the default router has been changed following a router advertisement received from the access router 309, the IP 335a issues a buffering cancellation command to the TCP/UDP 333a. Thereby, the TCP/UDP 333a detects that the default router has changed. Having received the buffering cancellation command, the TCP/UDP 333a cancels buffering and transmits the TCP acks that were buffered in the TCP ack buffering space 333b to the IP 335a. As noted above, the TCP acks transferred to the IP 335a are transmitted via the link 337a to the interface 337b, and from the interface 337b to the access router 309 (set as the default router) which provides the newly connected external link.

Figure 9:
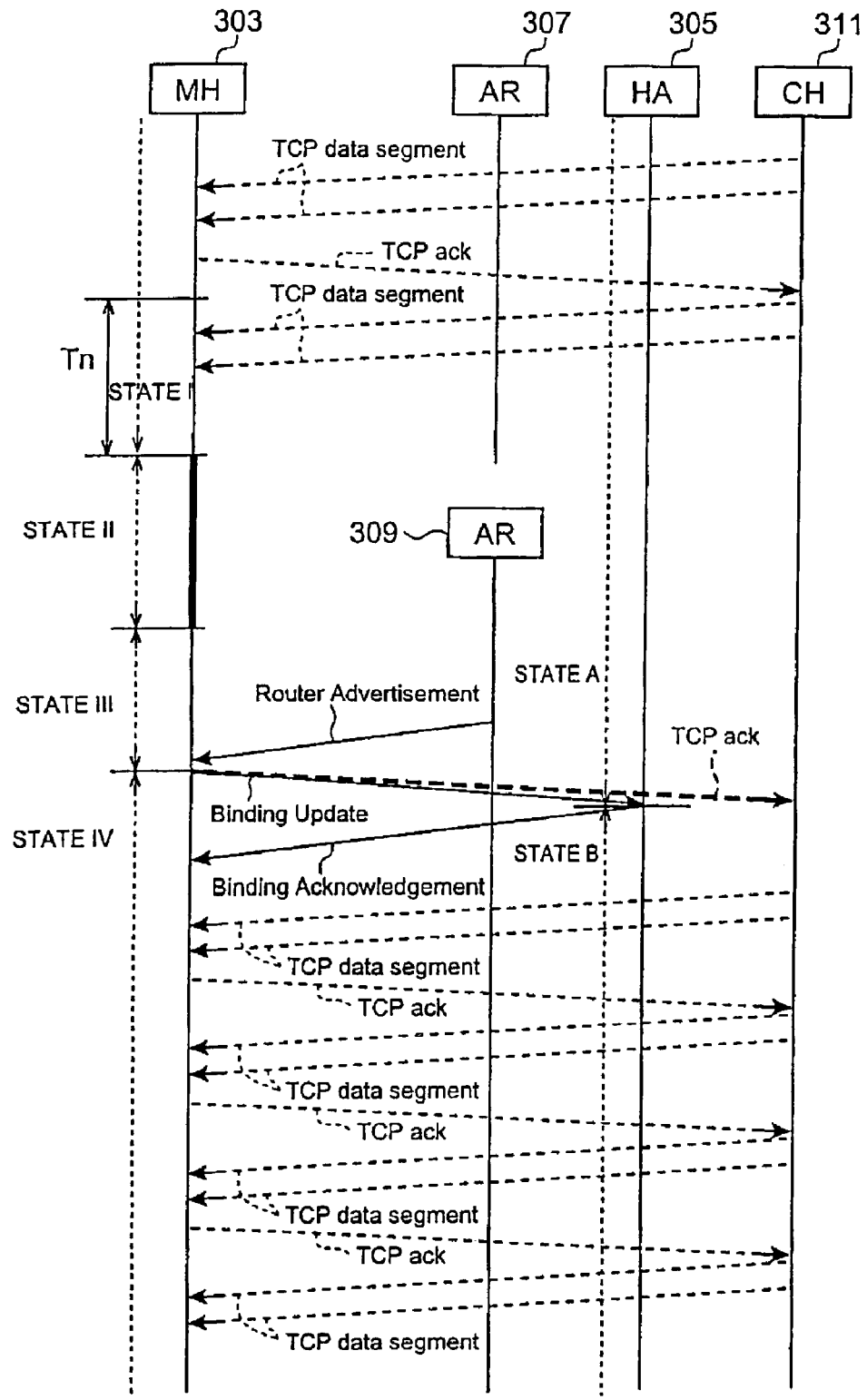
FIG. 9 is a sequence chart for a case in which the mobile host hands off during reception of data transfer using TCP from a correspondent host.
Figure 20:
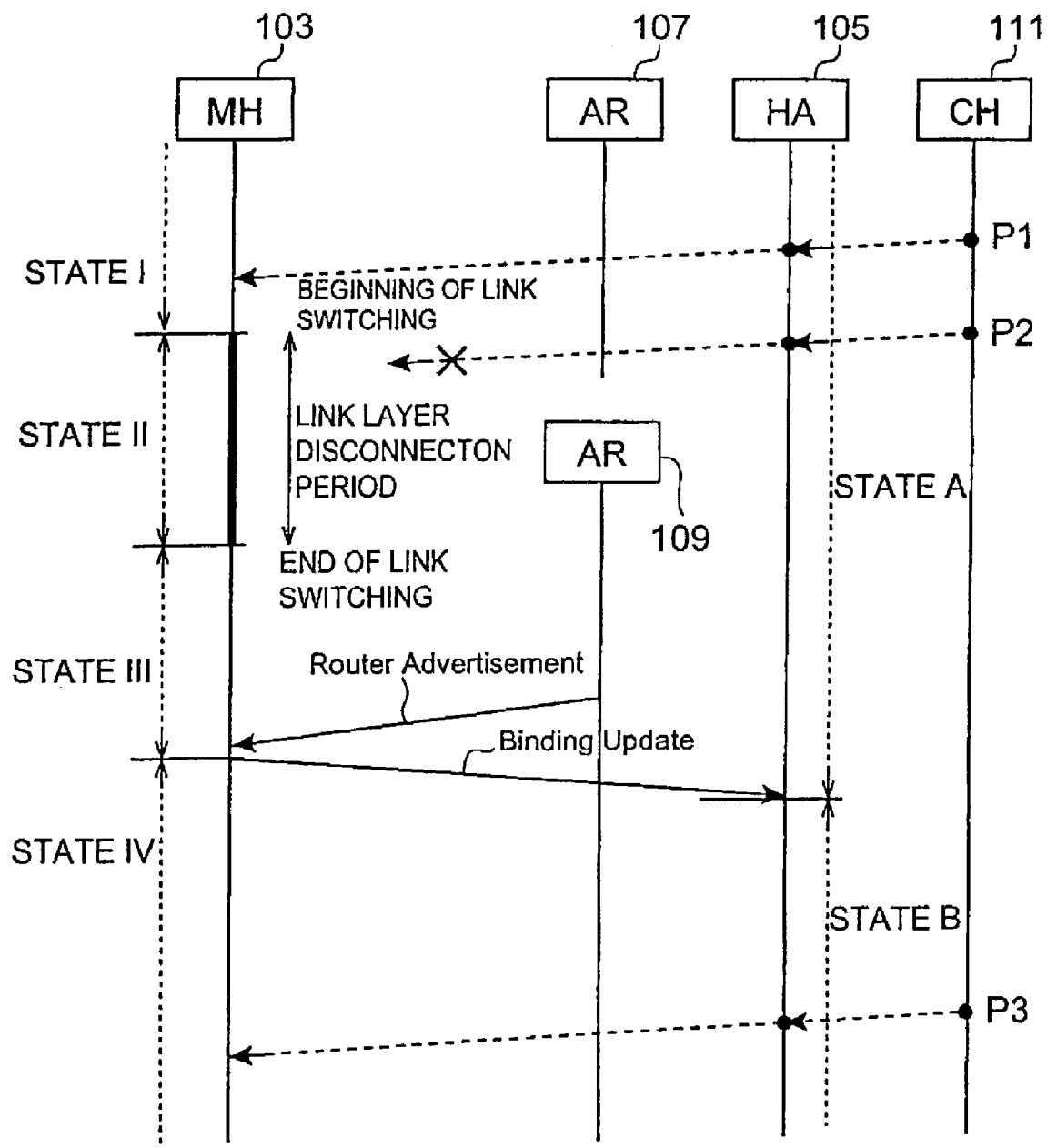
FIG. 20 is a sequence chart showing state transitions during a hand-off by a conventional mobile host.
Figure 21:
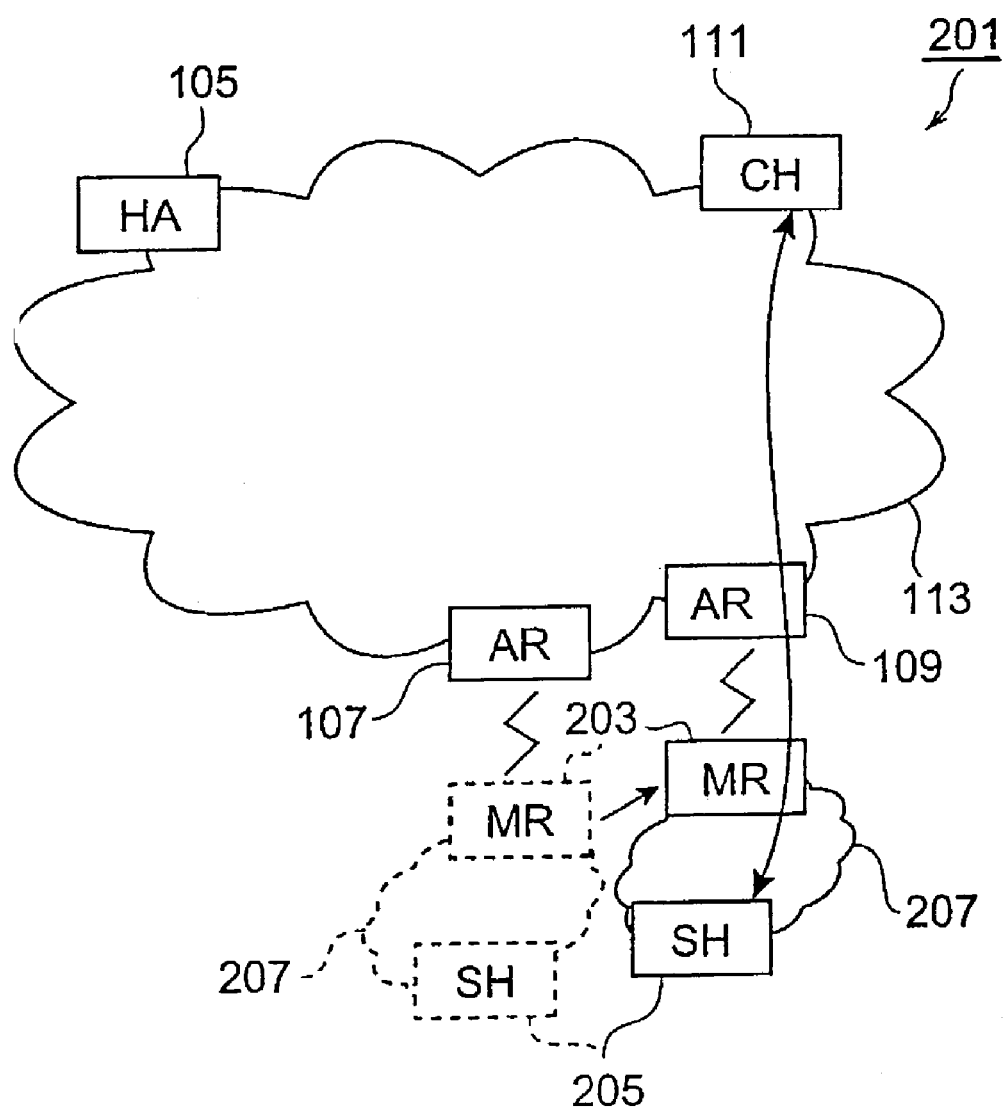
FIG. 21 is a block diagram showing an example of a conventional mobile communication system.

FIG. 9 is a sequence chart for a case in which the mobile host 303 hands off from the access router 307 to the access router 309 during reception of data transfer using TCP from the correspondent host 311. The broken line arrows represent TCP data segments transmitted to the mobile host 303 by the correspondent host 311 and TCP acks transmitted to the correspondent host 311 by the mobile host 303. State I to state IV and states A, B in FIG. 9 correspond to the states I to IV and states A, B described in FIG. 20.

At a predetermined time (Tn) before moving from state I to state II, the mobile host 303 buffers the TCP acks to be transmitted. Then, when the mobile host 303 receives a router advertisement from the access router 309, thereby changing the default router from the access router 307 to the access router 309 and obtaining a new care-of address, processing moves to state IV and the mobile host 303 transmits the buffered TCP acks.

Note that when the mobile host 303 obtains a new care-of address for use on an external link, the mobile host 303 transmits a packet containing a binding update option to the home agent 305. Having received the binding update packet, the home agent 305 stores the binding (the correspondence between the home address and care-of address of the mobile host 303) and transmits a packet containing a binding acknowledgement option to the mobile host 303 as a confirmation response.

As described above, during a hand-off between the access routers 307, 309 in this third embodiment, the mobile host 303 buffers the TCP acks that were to be transmitted during the hand-off period, and when the hand-off is complete, transmits the buffered TCP acks. In so doing, the correspondent host 311 becomes unable to receive TCP acks from the moving host 303 during the hand-off period. The correspondent host 311 therefore withholds transmission of the next TCP data segment. If the correspondent host 311 does not transmit TCP data segments, then naturally no TCP data segments become subject to packet loss during the TCP ack hand-off. Once the moving host 303 has completed the hand-off, the moving host 303 transmits the buffered TCP acks again, whereby these TCP acks are received by the correspondent host 311. The correspondent host 311 then restarts transmission of the next TCP data segment. During the period in which the TCP acks are being buffered, data transfer by the correspondent host 311 is halted, but this period equals the amount of time taken for the hand-off (approximately 100 ms or less). On the other hand, the period in which data transfer by the correspondent host 311 is halted due to successive TCP data segment loss equals the amount of time taken for a TCP retransmit timer to expire (at least one second). Thus TCP throughput deterioration due to TCP ack buffering is smaller than TCP throughput deterioration due to successive TCP data segment loss. Hence a dramatic deterioration in TCP throughput during a hand-off of the mobile host 303 can be prevented.

Also in the third embodiment, the period during which the mobile host 303 buffers TCP acks is set as a period from a predetermined time (Tn) prior to the beginning of the link layer 337 disconnection period, during which the link layer 307 of the mobile host 303 is not connected to any external links in order to switch connection points, to the point at which the access router 309 providing the newly connected external link following the end of the link layer 337 disconnection period becomes the default router. Hence the TCP ack buffering period can be set highly appropriately so that TCP acks are not buffered any more than is necessary and TCP throughput deterioration can be further prevented.

Also according to the third embodiment, the predetermined time (Tn) before the beginning of the link layer 337 disconnection period is detected in the transport layer 333 (TCP/UDP 333a) by means of a signal from the interface 337b which is connected to the external link, and a change in default router is detected therein by means of a signal from the IP layer 335 of the mobile host 303. Thus the TCP ack buffering period can be detected appropriately and easily.

Note that when a TCP ack is buffered, TCP ack buffering is performed for each TCP connection, and when, for each TCP connection, a newly buffered TCP ack corresponds to a TCP data segment with a larger sequence number than the currently buffered TCP ack, the currently buffered TCP ack may be replaced by the newly buffered TCP ack. A TCP ack informs the transmission side host of the largest TCP data segment sequence number received up to that point by the reception side host, and therefore when two TCP acks have different sequence numbers, the TCP ack for notifying the larger sequence number doubles as reception confirmation for the TCP data segments up to the smaller sequence number. In other words, by replacing a currently buffered TCP ack when a later TCP ack is to notify a larger sequence number than the currently buffered TCP ack, the TCP ack buffering space 333b can be economized.

Fourth Embodiment

The constitution of the mobile communication system in the fourth embodiment is identical to the mobile communication system 301 of the third embodiment as shown in FIG. 7, and therefore description thereof is omitted.

Figure 10:
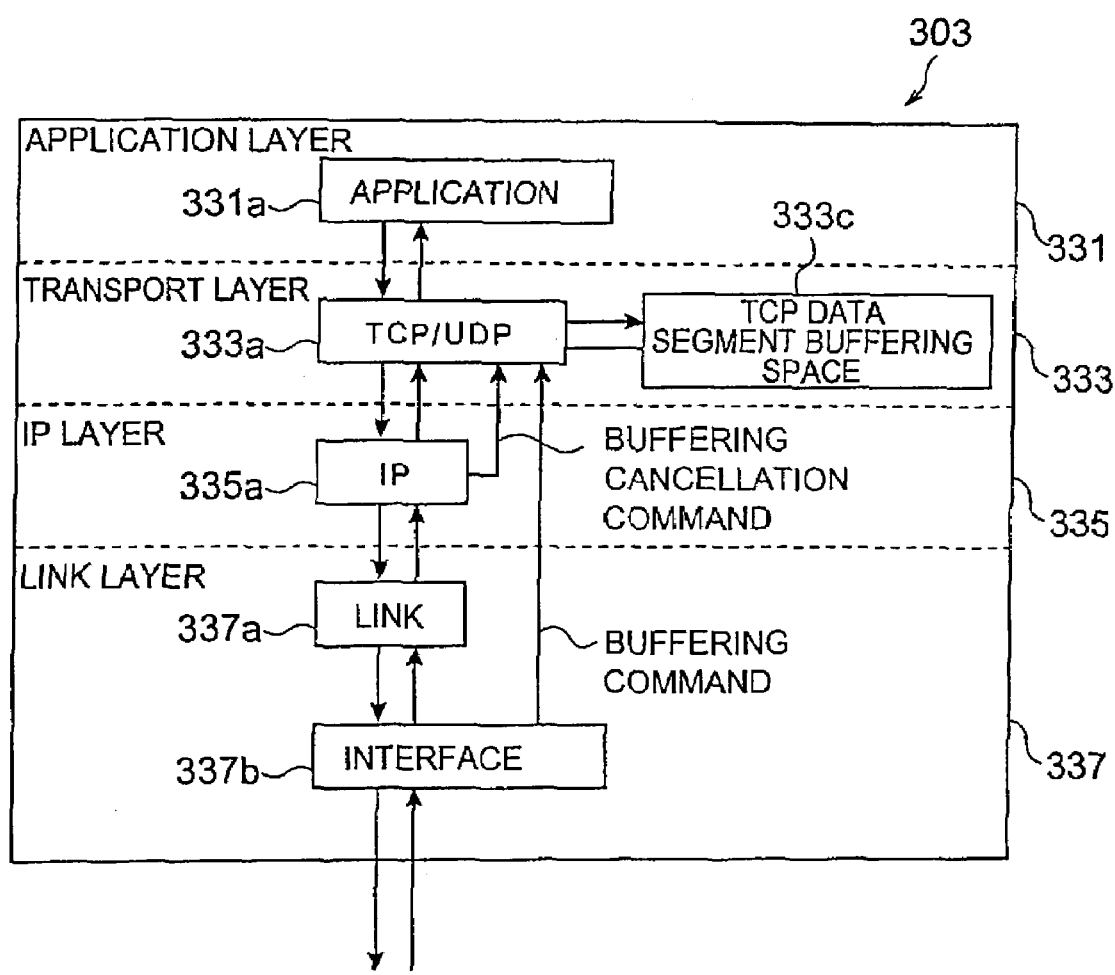
FIG. 10 is a view showing a constitution of a mobile host in a mobile communication system according to a fourth embodiment.

FIG. 10 is a view showing the constitution of the mobile host 303 used in the mobile communication system of the fourth embodiment. The mobile host 303 is provided with an application layer 331 comprising an application 331a, a transport layer 333 comprising a TCP/UDP 333a and a TCP data segment buffering space 333c, an IP layer 335 comprising an IP 335a, and a link layer 337 comprising a link 337a and an interface 337b.

The TCP data segment buffering space 333c is used for buffering TCP data segments during a hand-off period. The TCP/UDP 333a buffers TCP data segments into the TCP data segment buffering space 333c. The TCP data segment buffering period is a period which extends from a predetermined time (Tn) before the beginning of a link layer 337 disconnection period required for switching connection points, when the link layer 337 of the mobile host 303 is not connected to any external links, to the point at which the access router providing the newly connected external link becomes the default router following the end of the link layer 337 disconnection period. Here, the TCP/UDP 333a detects the predetermined time (Tn) before the beginning of the link layer 337 disconnection period by means of a signal from the interface 337b, and detects a change in default router by means of a signal from the IP 335a. Here, the range of the predetermined time (Tn) begins from zero. Here, the predetermined time (Tn) is preferably set equal to or greater than the round trip time between the mobile host and the correspondent host, or in other words the time in which a TCP ack newly transmitted by the correspondent host in response to the reception by the correspondent host of the last transmitted TCP data segment prior to the beginning of buffering can be received via the currently connected access router.

When the connection point is switched from the access router 307 to the access router 309, the interface 337b issues a buffering command to the TCP/UDP 333a. Thereby, the TCP/UDP 333a detects the predetermined time (Tn) before the beginning of the link layer 337 disconnection period. Having received the buffering command, the TCP/UDP 333a uses the TCP data segment buffering space 333c to begin buffering the TCP data segments which were originally intended for transmission to the IP 335a.

Once the default router has been changed following a router advertisement received from the access router 309, the IP 335a issues a buffering cancellation command to the TCP/UDP 333a. Thereby, the TCP/UDP 333a detects that the default router has changed. Having received the buffering cancellation command, the TCP/UDP 333a cancels buffering and transmits the TCP data segments that were buffered in the TCP data segment buffering space 333c to the IP 335a. As noted above, the TCP data segments transferred to the IP 335a are transmitted via the link 337a to the interface 337b, and from the interface 337b to the access router 309 (set as the default router) which provides the newly connected external link.

Figure 11:
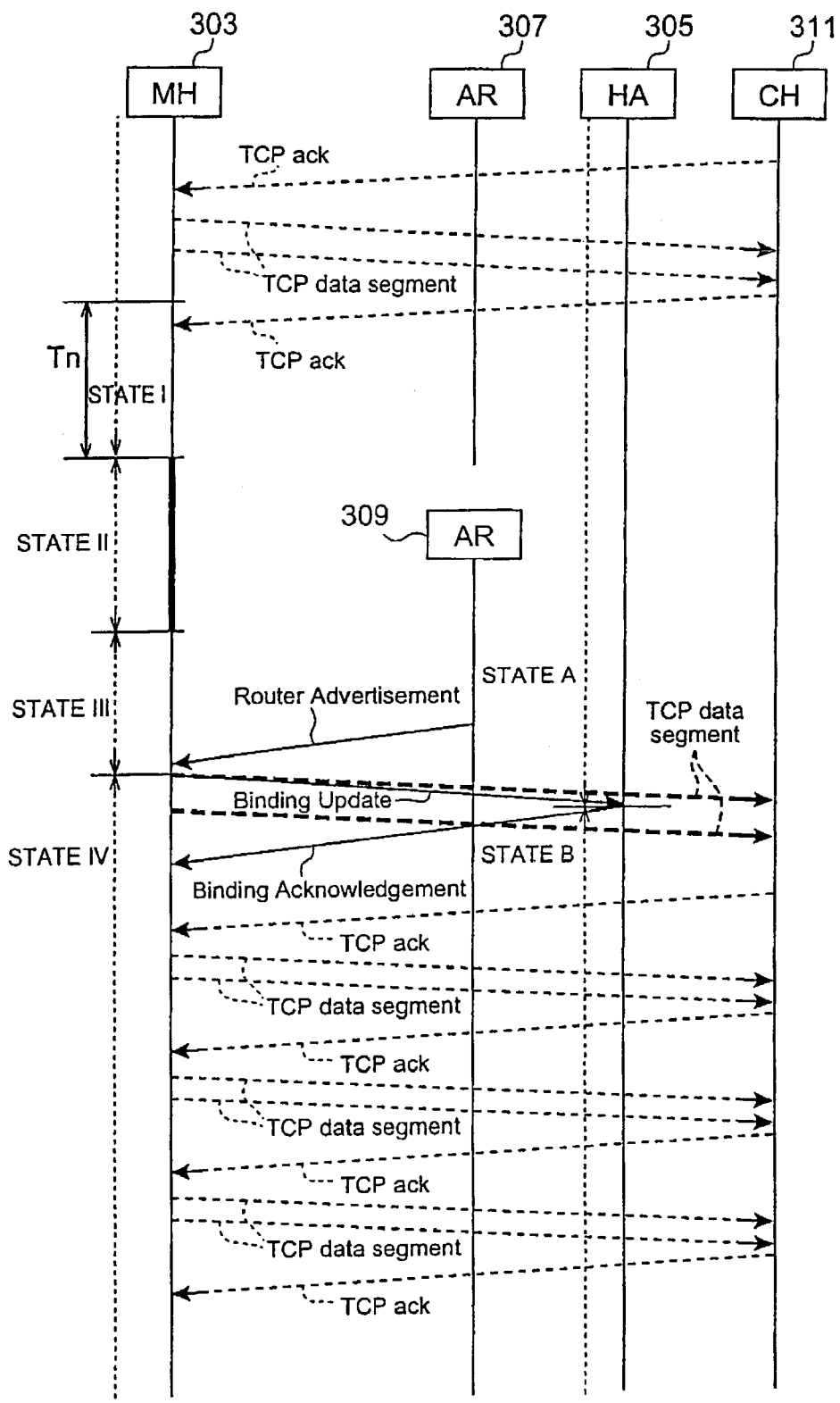
FIG. 11 is a sequence chart for a case in which the mobile host hands off during the transfer of data using TCP to a correspondent host.

FIG. 11 is a sequence chart for a case in which the mobile host 303 hands off from the access router 307 to the access router 309 during the transfer of data to the correspondent host 311 using TCP. The broken line arrows represent TCP data segments transmitted from the mobile host 303 to the correspondent host 311 and TCP acks transmitted from the correspondent host 311 to the mobile host 303. State I to state IV and states A, B in FIG. 11 correspond to the states I to IV and states A, B described in FIG. 20.

At a predetermined time (Tn) before moving from state I to state II, the mobile host 303 buffers the TCP data segments to be transmitted. Then, when the mobile host 303 receives a router advertisement from the access router 309, thereby changing the default router from the access router 307 to the access router 309 and obtaining a new care-of address, processing moves to state IV and the mobile host 303 transmits the buffered TCP data segments.

As described above, during a hand-off between the access routers 307, 309 in this fourth embodiment, the mobile host 303 buffers the TCP data segments that were to be transmitted during the hand-off period, and when the hand-off is complete, transmits the buffered TCP data segments. In so doing, the correspondent host 311 becomes unable to receive TCP data segments from the mobile host 303 during the hand-off period of the mobile host 303. Hence the correspondent host 311 does not transmit TCP acks. Since the correspondent host 311 does not transmit TCP acks, then naturally no TCP acks become subject to packet loss during the hand-off of the mobile host 303. Once the mobile host 303 has completed the hand-off, the mobile host 303 transmits the buffered TCP data segments again, whereby these TCP data segments are received by the correspondent host 311. The correspondent host 311 then transmits the corresponding TCP acks. During the period in which the TCP data segments are being buffered, data transmission by the mobile host 303 is halted, but this period equals the amount of time taken for the hand-off (approximately 100 ms or less). On the other hand, the period in which data transfer by the mobile host 303 is halted due to the inability to obtain an opportunity to transmit the TCP data segments equals the amount of time taken for a TCP retransmit timer to expire (at least one second). Thus TCP throughput deterioration due to TCP data segment buffering is smaller than TCP throughput deterioration due to the inability to obtain an opportunity to transmit the TCP data segments. Hence a dramatic deterioration in TCP throughput during a hand-off of the mobile host 303 can be prevented.

Also in the fourth embodiment, the period during which the mobile host 303 buffers TCP data segments is set as a period from a predetermined time (Tn) prior to the beginning of the link layer 337 disconnection period, during which the link layer 337 of the mobile host 303 is not connected to any external links in order to switch connection points, to the time at which the access router 309 providing the newly connected external link becomes the default router following the end of the link layer 337 disconnection period. Hence the TCP data segment buffering period can be set highly appropriately so that TCP data segments are not buffered any more than is necessary and TCP throughput deterioration can be further prevented.

Also according to the fourth embodiment, the predetermined time (Tn) before the beginning of the link layer 337 disconnection period is detected in the transport layer 333 (TCP/UDP 333a) by means of a signal from the interface 337b which is connected to the external link, and a change in default router is detected therein by means of a signal from the IP layer 335 of the mobile host 303. Thus the TCP data segment buffering period can be detected appropriately and easily.

Fifth Embodiment

Figure 12:
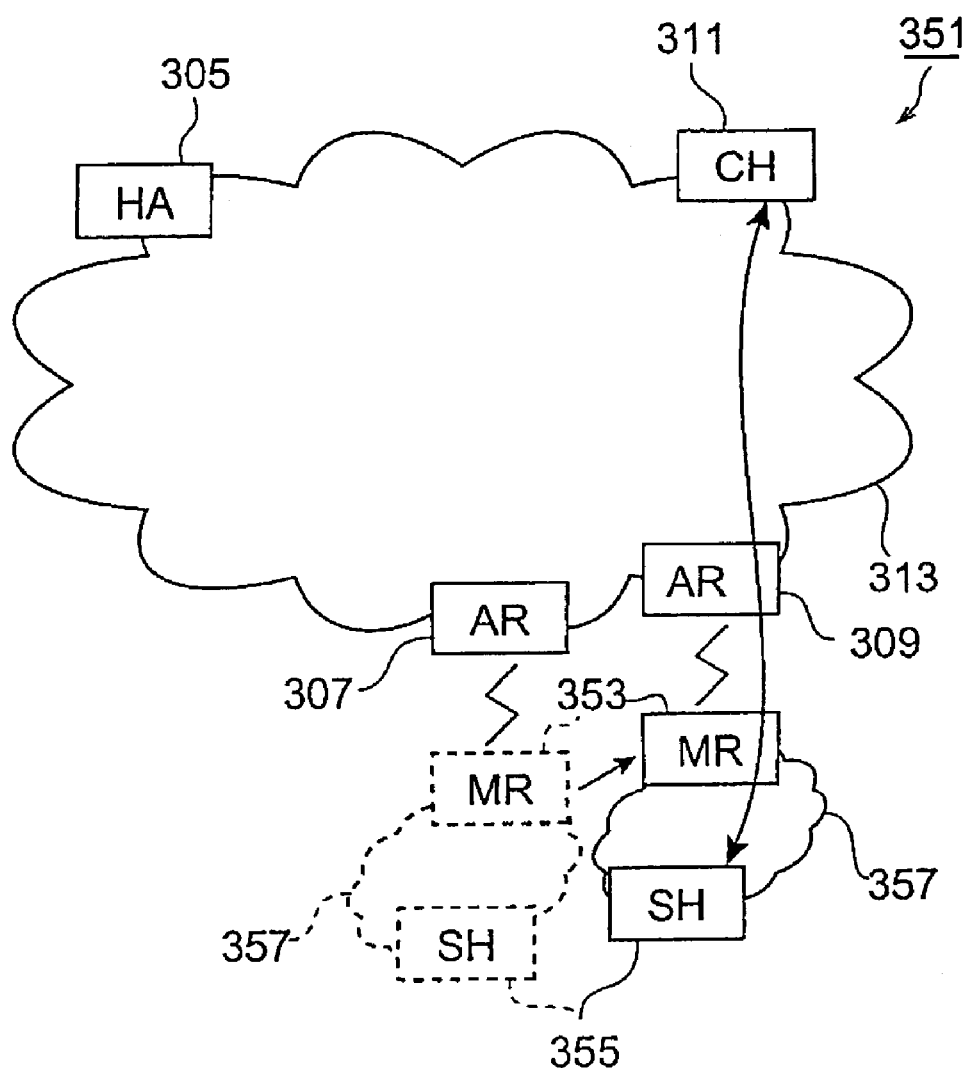
FIG. 12 is a view showing a constitution of a mobile communication system according to a fifth embodiment.

FIG. 12 is a view showing the constitution of a mobile communication system according to a fifth embodiment. In FIG. 12, SH indicates a stationary host, MR indicates a mobile router, HA indicates a home agent, AR indicates an access router, and CH indicates a correspondent host.

As shown in FIG. 12, a mobile communication system 351 comprises a mobile router 353, a stationary host 355, the home agent 305, the plurality of access routers 307, 309, the correspondent host 311, and the IP network 313.

The mobile router 353 moves from link to link with a mobile network 357 comprising the stationary host 355, and functions as a gateway router for the mobile network 357. The mobile router 353 uses a home address on a home link, and on an external link uses the home address and a care-of address having a link prefix for each link. The stationary host 355 is anode having an unchanging connection relationship with the mobile router 353. Note that the mobile network 357 may also comprise a router or a mobile host. The home agent 305 provides the mobile router 353 with a home link, and the access routers provide the mobile router 353 with external links.

The mobile router 353 informs the home agent 305 of binding comprising "home address of this node and network prefixes within the mobile network 357" and "care-of address obtained by a connection link", and the home agent 305 stores this binding. Having received a packet addressed to the home address of the mobile router 353 or a packet addressed to an address belonging to a network prefix within the mobile network 357, the home agent 305 creates an IP packet addressed to the bound care-of address, stores this packet in a payload portion, and forwards the packet to the mobile router 353. Having received the forwarded packet, the mobile router 353 extracts the original packet from the payload portion, and if the packet is addressed to a host existing within the mobile network 357, routes the packet within the mobile network 357.

Figure 13:
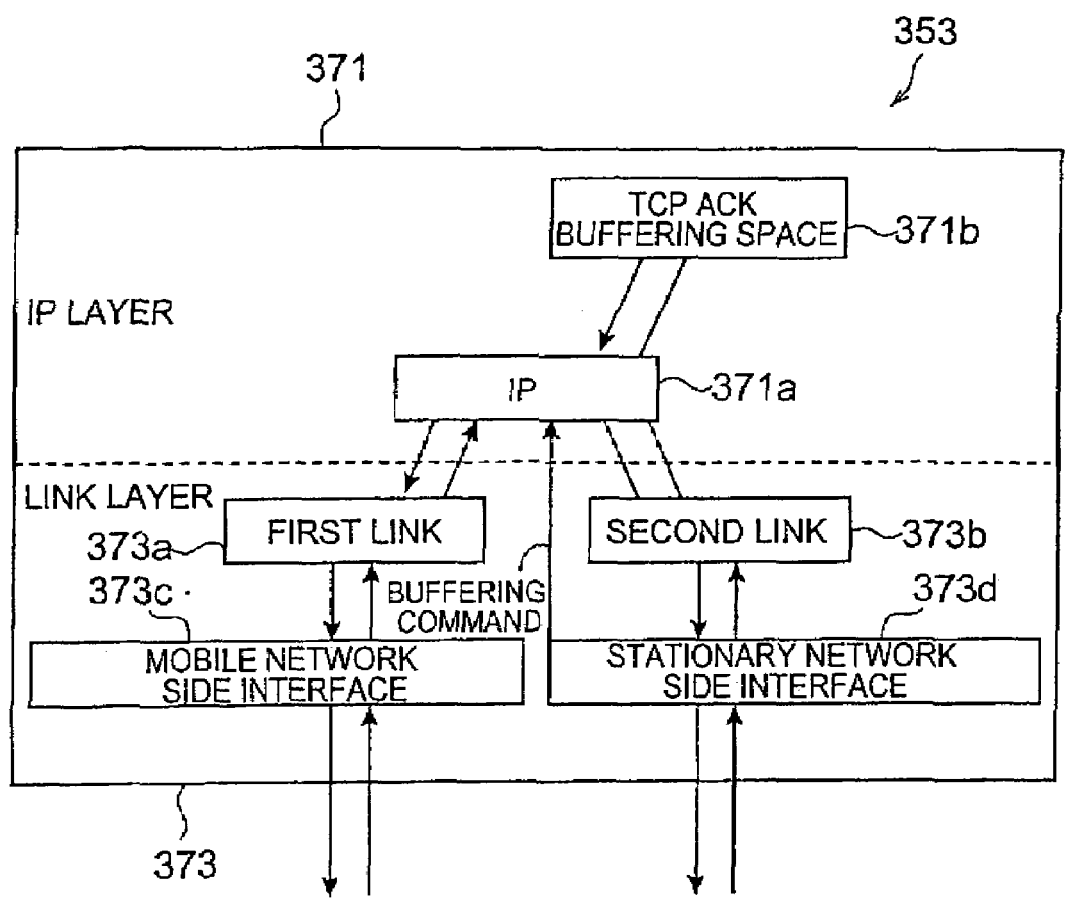
FIG. 13 is a view showing a constitution of a mobile router.

FIG. 13 is a view showing the constitution of the mobile router. The mobile router is provided with an IP layer 371 comprising an IP 371a and a TCP ack buffering space 371b, and a link layer 373 comprising a first link 373a, a second link 373b, a mobile network side interface 373c, and a stationary network side interface 373d.

Packets received from the mobile network side interface 373c or the stationary network side interface 373d reach the IP 371a through the first link 373a and second link 373b respectively. The IP 371a references a routing table to determine whether to transmit the packets to the stationary network side (default router) or the mobile network 357 side (stationary host 355), and transfers the packets to the second link 373b or the first link 373a in accordance with the result of this determination.

The TCP ack buffering space 371b is used for buffering TCP acks during a hand-off period. The IP 371a buffers TCP acks into the TCP ack buffering space 371b. The TCP ack buffering period is set as a period from a predetermined time (Tn) prior to the beginning of a link layer (second link 373b and stationary network side interface 373d) disconnection period, during which the second link 373b and stationary network side interface 373d of the link layer 373 in the mobile router 353 are not connected to any external links in order to switch connection points, to the point at which the access router 309 providing a newly connected external link becomes the default router following the end of the link layer (second link 373b and stationary network side interface 373d) disconnection period. Here, the IP 371a detects the predetermined time (Tn) prior to the beginning of the link layer (second link 373b and stationary network side interface 373d) disconnection period by means of a signal from the stationary network side interface 373d, and detects a change in default router itself. Here, the range of the predetermined time (Tn) begins from zero. Here, the predetermined time (Tn) is preferably set equal to or greater than the round trip time between the stationary host and the correspondent host, or in other words the time in which a TCP data segment newly transmitted by the correspondent host in response to the reception by the correspondent host of the last transmitted TCP ack prior to the beginning of buffering can be received via the currently connected access router.

The stationary network side interface 373d issues a buffering command to the IP 371a when the connection point is changed from the access router 307 to the access router 309. Thereby the IP 371a detects the predetermined time (Tn) prior to the beginning of the link layer (second link 373b and stationary network side interface 373d) disconnection period. Having received the buffering command, the IP 371a uses the TCP ack buffering space 371b to begin buffering the TCP acks which were originally due to be transmitted to the second link 373b.

Once the default router has been changed following a router advertisement received from the access router 309, the IP 371a itself detects that the default router has changed and cancels buffering. The IP 371a then transmits the TCP acks that were buffered in the TCP ack buffering space 371b to the second link 373b. As noted above, the TCP acks transferred to the second link 373b are transmitted from the stationary network side interface 373b to the access router 309 (set as the default router) providing the newly connected external link.

Figure 14:
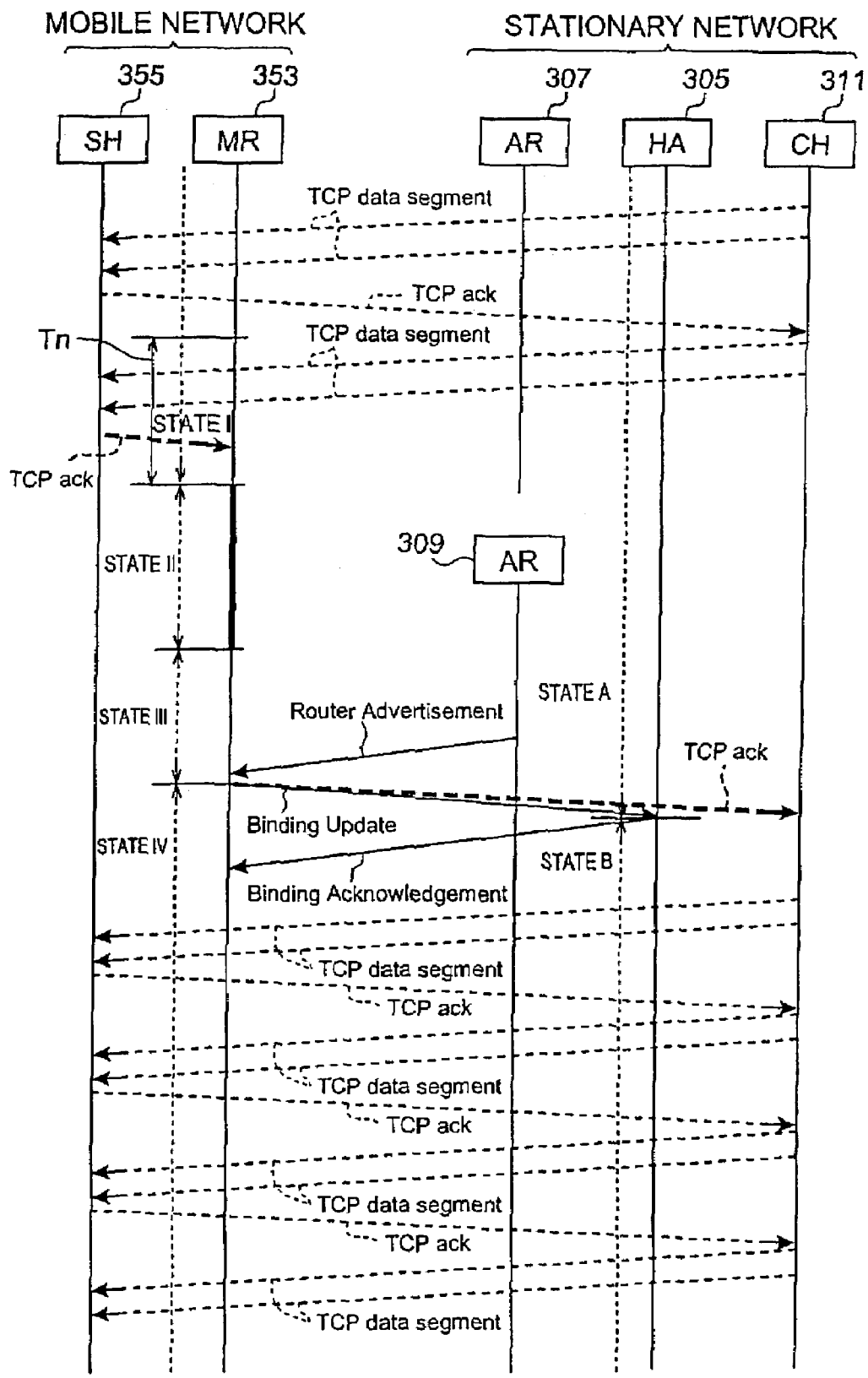
FIG. 14 is a sequence chart for a case in which the mobile router hands off while a stationary host in a mobile network receives data transfer using TCP from a correspondent host.
Figure 22:
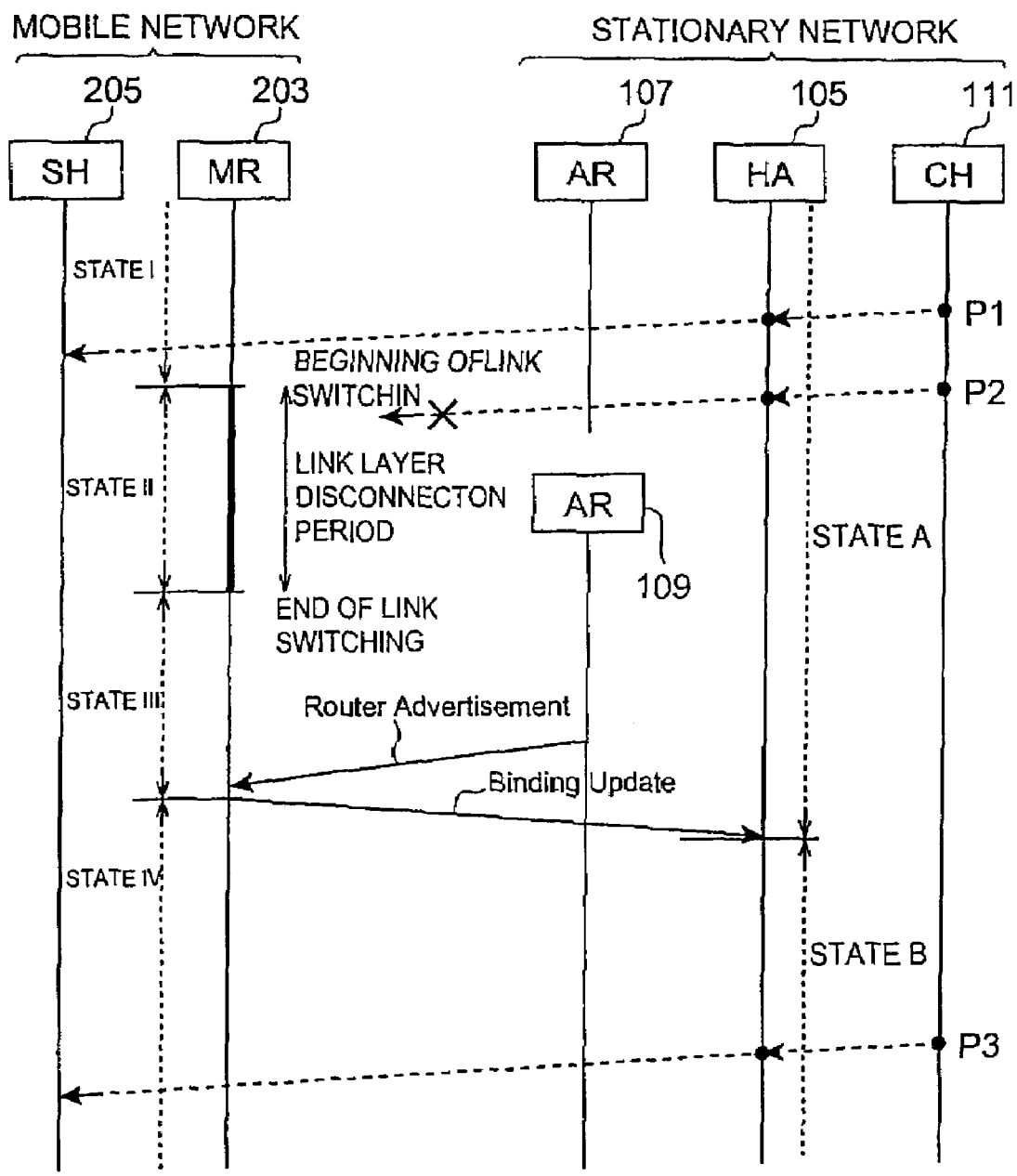
FIG. 22 is a sequence chart showing state transitions during a hand-off by a conventional mobile router.

FIG. 14 is a sequence chart for a case in which the mobile router 353 hands off from the access router 307 to the access router 309 while the stationary host 355 in the mobile network 357 is in reception of data transfer using TCP from the correspondent host 311. The broken line arrows represent TCP data segments transmitted to the stationary host 355 by the correspondent host 311 and TCP acks transmitted to the correspondent host 311 by the stationary host 355. State I to state IV and states A, B in FIG. 14 correspond to the states I to IV and states A, B described in FIG. 22.

At a predetermined time (Tn) before moving from state I to state II, the mobile router 353 buffers the TCP acks to be routed to the stationary network side. Then, when the mobile router 353 receives a router advertisement from the access router 309, thereby changing the default router from the access router 307 to the access router 309 and obtaining a new care-of address, processing moves to state IV and the mobile router 353 routes the buffered TCP acks.

Note that when the mobile router 353 obtains a new care-of address for use on an external link, the mobile router 353 transmits a packet containing a binding update option to the home agent 305. Having received the binding update packet, the home agent 305 stores the binding (the correspondence between the home address and care-of address of the mobile router 353) and transmits a packet containing a binding acknowledgement option to the mobile router 353 as a confirmation response.

As described above, during a hand-off between the access routers 307, 309 in this fifth embodiment, the mobile router 353 buffers the TCP acks that were to be routed to the stationary network side during the hand-off period, and when the hand-off is complete, routes the buffered TCP acks. In so doing, the correspondent host 311 becomes unable to receive TCP acks from the stationary host 355 during the hand-off period by the mobile router 353. The correspondent host 311 therefore withholds transmission of the next TCP data segment. If the correspondent host 311 does not transmit TCP data segments, then naturally no TCP data segments become subject to packet loss during the hand-off by the mobile router 353. Once the mobile router 353 has completed the hand-off, the mobile router 353 routes the buffered TCP acks again, whereby these TCP acks are received by the correspondent host 311. The correspondent host 311 then restarts transmission of the next TCP data segment. During the period in which the TCP acks are being buffered, data transfer by the correspondent host 311 is halted, but this period equals the amount of time taken for the hand-off (approximately 100 ms or less). On the other hand, the period in which data transfer by the correspondent host 311 is halted due to successive TCP data segment loss equals the amount of time taken for a TCP retransmit timer to expire (at least one second). Thus TCP throughput deterioration due to TCP ack buffering is smaller than TCP throughput deterioration due to successive TCP data segment loss. Hence a dramatic deterioration in TCP throughput during a hand-off of the mobile router 353 can be prevented.

Further, in the fifth embodiment the TCP ack buffering period by the mobile router 353 is set as a period from a predetermined time (Tn) prior to the beginning of the link layer (second link 373b and stationary network side interface 373d) disconnection period, during which the second link 373b and stationary network side interface 373d of the link layer 373 in the mobile router 353 are not connected to any external links in order to switch connection points, to the time at which the access router 309 providing the newly connected external link becomes the default router following the end of the link layer (second link 373b and stationary network side interface 373d) disconnection period. Hence the TCP ack buffering period can be set highly appropriately so that TCP acks are not buffered any more than is necessary and TCP throughput deterioration can be further prevented.

Also according to the fifth embodiment, the predetermined time (Tn) prior to the beginning of a link layer (second link 373b and stationary network side interface 373d) disconnection period is detected in the IP layer 371 (IP 371a) by means of a signal from the stationary network side interface 373d which is connected to the external link, and a change in default router is detected by the IP 371a itself. Thus the TCP ack buffering period can be detected appropriately and easily.

Note that when a TCP ack is buffered, TCP ack buffering is performed for each TCP connection, and when, for each TCP connection, a newly buffered TCP ack is in respect of a TCP data segment with a larger sequence number than the currently buffered TCP ack, the currently buffered TCP ack may be replaced by the newly buffered TCP ack. A TCP ack informs the transmission side host of the largest TCP data segment sequence number received up to that point by the reception side host, and therefore when two TCP acks have different sequence numbers, the TCP ack for notifying the larger sequence number doubles as reception confirmation for the TCP data segments up to the smaller sequence number. In other words, by replacing a currently buffered TCP ack when a later TCP ack is to notify a larger sequence number than the currently buffered TCP ack, the TCP ack buffering space 371b can be economized.

Sixth Embodiment

The constitution of the mobile communication system in the sixth embodiment is identical to the mobile communication system 351 of the fifth embodiment as shown in FIG. 12, and therefore description thereof is omitted.

Figure 15:
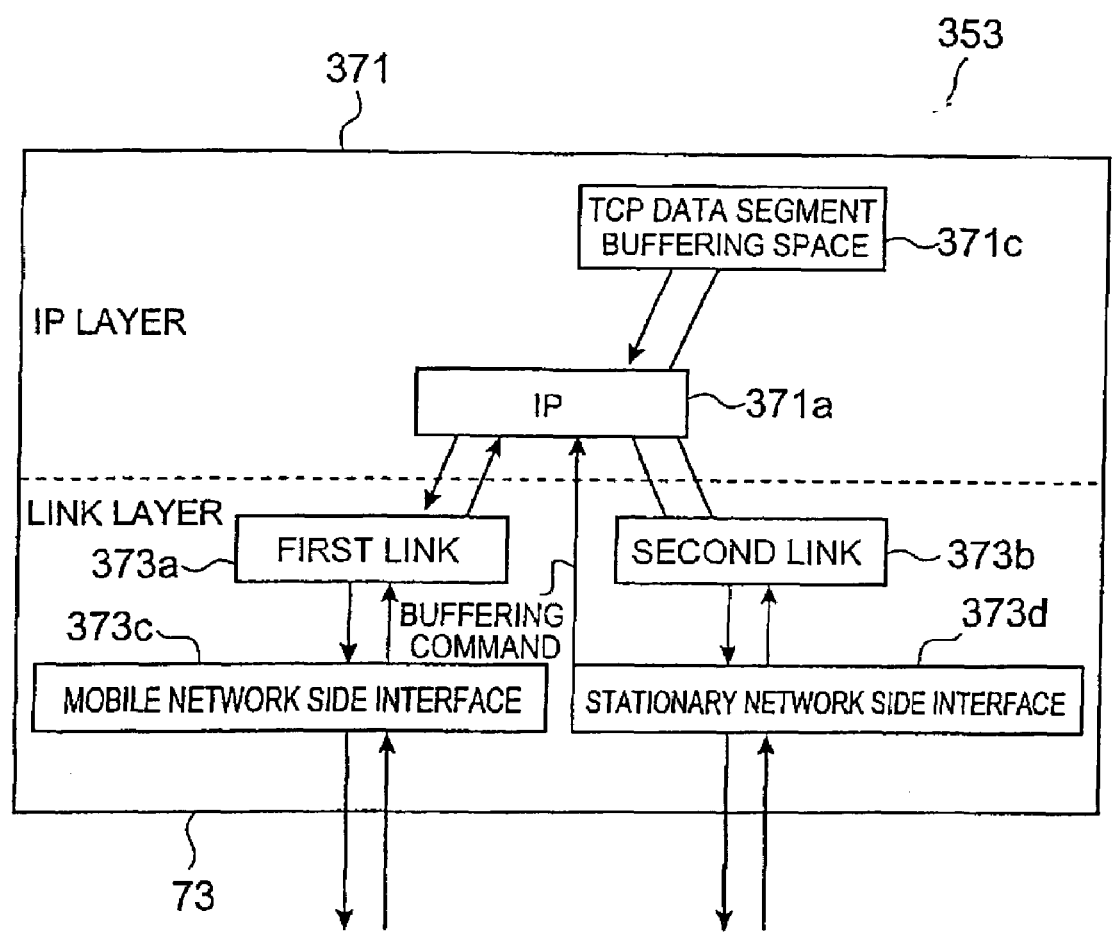
FIG. 15 is a view showing a constitution of a mobile router in a mobile communication system according to a sixth embodiment.

FIG. 15 is a view showing the constitution of the mobile router 353 used in the mobile communication system of the sixth embodiment. An IP layer 371 comprising an IP 371a and a TCP data segment buffering space 371c, and a link layer 373 comprising a first link 373a, a second link 373b, a mobile network side interface 373c, and a stationary network side interface 373d are provided.

The TCP data segment buffering space 371c is used for buffering TCP data segments during a hand-off period. The IP 371a buffers TCP data segments into the TCP data segment buffering space 371c. The TCP data segment buffering period is set as a period from a predetermined time (Tn) prior to the beginning of a link layer (second link 373b and stationary network side interface 373d) disconnection period, during which the second link 373b and stationary network side interface 373d of the link layer 373 in the mobile router 353 are not connected to any external links in order to switch connection points, to the time at which the access router 309 providing a newly connected external link becomes the default router following the end of the link layer (second link 373b and stationary network side interface 373d) disconnection period. Here, the IP 371a detects the predetermined time (Tn) prior to the beginning of the link layer (second link 373b and stationary network side interface 373d) disconnection period by means of a signal from the stationary network side interface 373d, and detects a change in default router itself. Here, the range of the predetermined time (Tn) begins from zero. Here, the predetermined time (Tn) is preferably set equal to or greater than the round trip time between the stationary host and the correspondent host, or in other words the time in which a TCP ack newly transmitted by the correspondent host in response to the reception by the correspondent host of the last transmitted TCP data segment prior to the beginning of buffering can be received via the currently connected access router.

The stationary network side interface 373d issues a buffering command to the IP 371a when the connection point is changed from the access router 307 to the access router 309. Thereby the IP 371*a* detects the predetermined time (Tn) prior to the beginning of the link layer (second link 373*b* and stationary network side interface 373*d*) disconnection period. Having received the buffering command, the IP 371*a* uses the TCP data segment buffering space 371*c* to begin buffering the TCP data segments which were originally due to be transmitted to the second link 373*b*.

Once the default router has been changed following a router advertisement received from the access router 309, the IP 371*a* itself detects that the default router has changed and cancels buffering. The IP 371*a* then transmits the TCP data segments that were buffered in the TCP data segment buffering space 371*c* to the second link 373*b*. As noted above, the TCP data segments transferred to the second link 373*b* are transmitted from the stationary network side interface 373*d* to the access router 309 (set as the default router) providing the newly connected external link.

Figure 16:
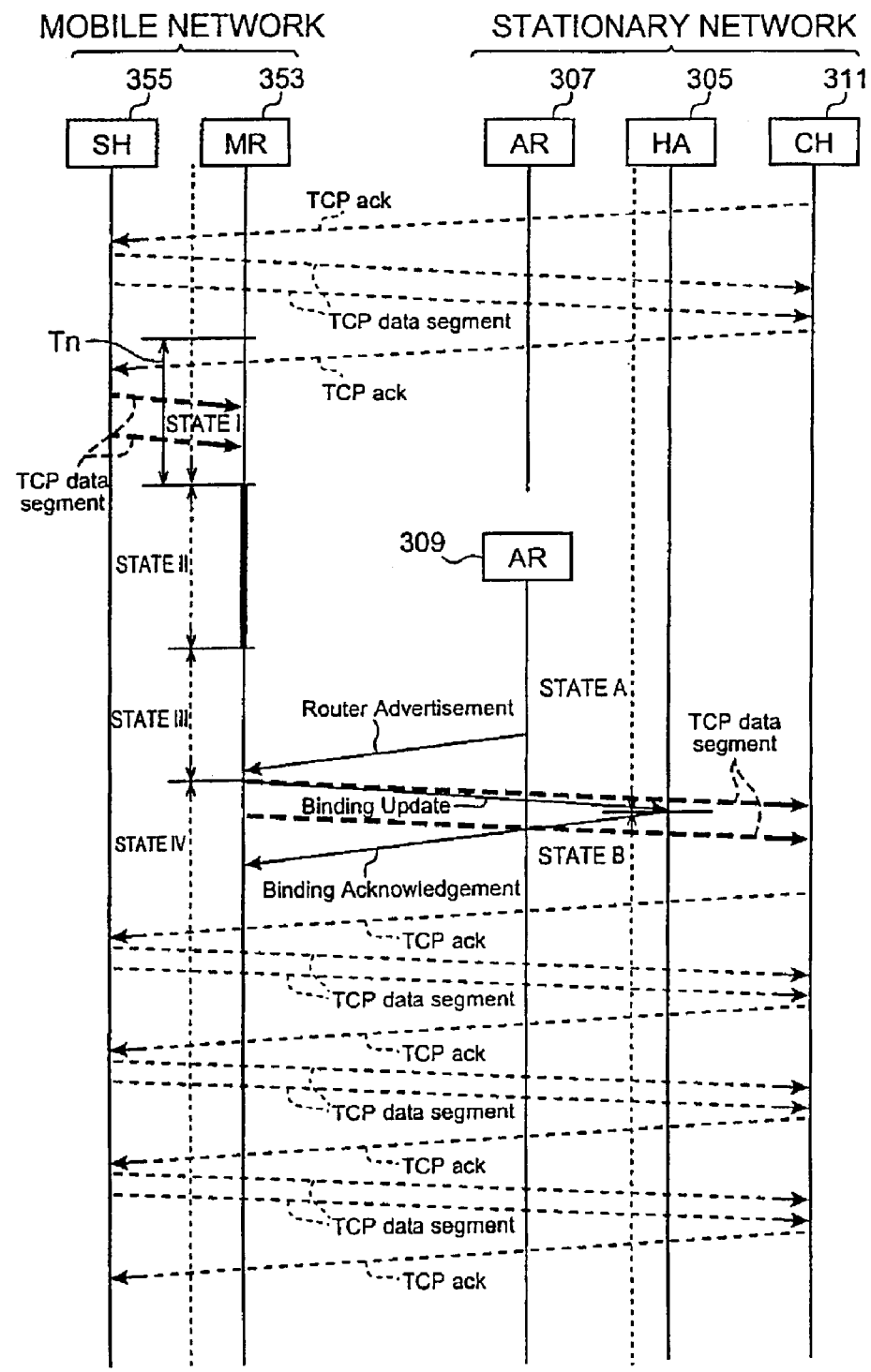
FIG. 16 is a sequence chart for a case in which the mobile router hands off while a stationary host in a mobile network performs data transfer using TCP to a correspondent host.

FIG. 16 is a sequence chart for a case in which the mobile router 353 hands off from the access router 307 to the access router 309 while the stationary host 355 in the mobile network 357 performs data transfer using TCP to the correspondent host 311. The broken line arrows represent TCP data segments transmitted from the stationary host 355 to the correspondent host 311 and TCP acks transmitted from the correspondent host 311 to the stationary host 355. State I to state IV and states A, B in FIG. 16 correspond to the states I to IV and states A, B described in FIG. 22.

At a predetermined time (Tn) before moving from state I to state II, the mobile router 353 buffers the TCP data segments to be routed to the stationary network side. Then, when the mobile router 353 receives a router advertisement from the access router 309, thereby changing the default router from the access router 307 to the access router 309 and obtaining a new care-of address, processing moves to state IV and the mobile router 353 routes the buffered TCP data segments.

As described above, during a hand-off between the access routers 307, 309 in this sixth embodiment, the mobile router 353 buffers the TCP data segments that were to be routed to the stationary network side during the hand-off period, and when the hand-off is complete, routes the buffered TCP data segments. In so doing, the correspondent host 311 becomes unable to receive TCP data segments from the stationary host 355 during the hand-off by the mobile router 353, and hence the correspondent host 311 does not transmit TCP acks. Since the correspondent host 311 does not transmit TCP acks, then naturally no TCP acks become subject to packet loss during the hand-off by the mobile router 353. Once the mobile router 353 has completed the hand-off, the mobile router 353 routes the buffered TCP data segments again, whereby these TCP data segments are received by the correspondent host 311. The correspondent host 311 then transmits the corresponding TCP acks. During the period in which the TCP data segments are being buffered, data transfer by the stationary host 355 is halted, but this period equals the amount of time taken for the hand-off (approximately 100 ms or less). On the other hand, the period in which data transfer by the stationary host 355 is halted due to the inability to obtain an opportunity to transmit the TCP data segments equals the amount of time taken for a TCP retransmit timer to expire (at least one second). Thus TCP throughput deterioration due to TCP data segment buffering by the mobile router 353 is smaller than TCP throughput deterioration due to the inability of the stationary host 355 to obtain an opportunity to transmit the TCP data segments. Hence a dramatic deterioration in TCP throughput during a hand-off of the mobile router 353 can be prevented.

Further, in the sixth embodiment the TCP data segment buffering period by the mobile router 353 is set as a period from a predetermined time (Tn) prior to the beginning of the link layer (second link 373*b* and stationary network side interface 373*d*) disconnection period, during which the second link 373*b* and stationary network side interface 373*d* of the link layer 373 in the mobile router 353 are not connected to any external links in order to switch connection points, to the time at which the access router 309 providing the newly connected external link becomes the default router following the end of the link layer (second link 373*b* and stationary network side interface 373*d*) disconnection period. Hence the TCP data segment buffering period can be set highly appropriately so that TCP data segments are not buffered any more than is necessary and TCP throughput deterioration can be further prevented.

Also according to the sixth embodiment, the predetermined time (Tn) prior to the beginning of a link layer (second link 373*b* and stationary network side interface 373*d*) disconnection period is detected in the IP layer 371 (IP 371*a*) by means of a signal from the stationary network side interface 373*d* which is connected to an external link, and a change in default router is detected by the IP 371*a* itself. Thus the TCP data segment buffering period can be detected appropriately and easily.

Next, a communication control program according to an embodiment of the present invention will be described. In order to transmit a packet, the communication control program causes a computer to function as means for buffering the packet during a hand-off period and transmitting the buffered packet when the hand-off is complete. The communication control program is recorded in a computer readable recording medium, for example. Here, a recording medium is an object which is capable of altering the state of energy such as magnetism, light, or electricity in accordance with the descriptive content of a program for a reading device installed in the hardware resources of a computer to thereby transmit the descriptive content of the program to the reading device in a corresponding signal format. This recording medium may be, for example, a magnetic disk, an optical disk, a CD-ROM, or memory installed in a computer.

Figure 17:
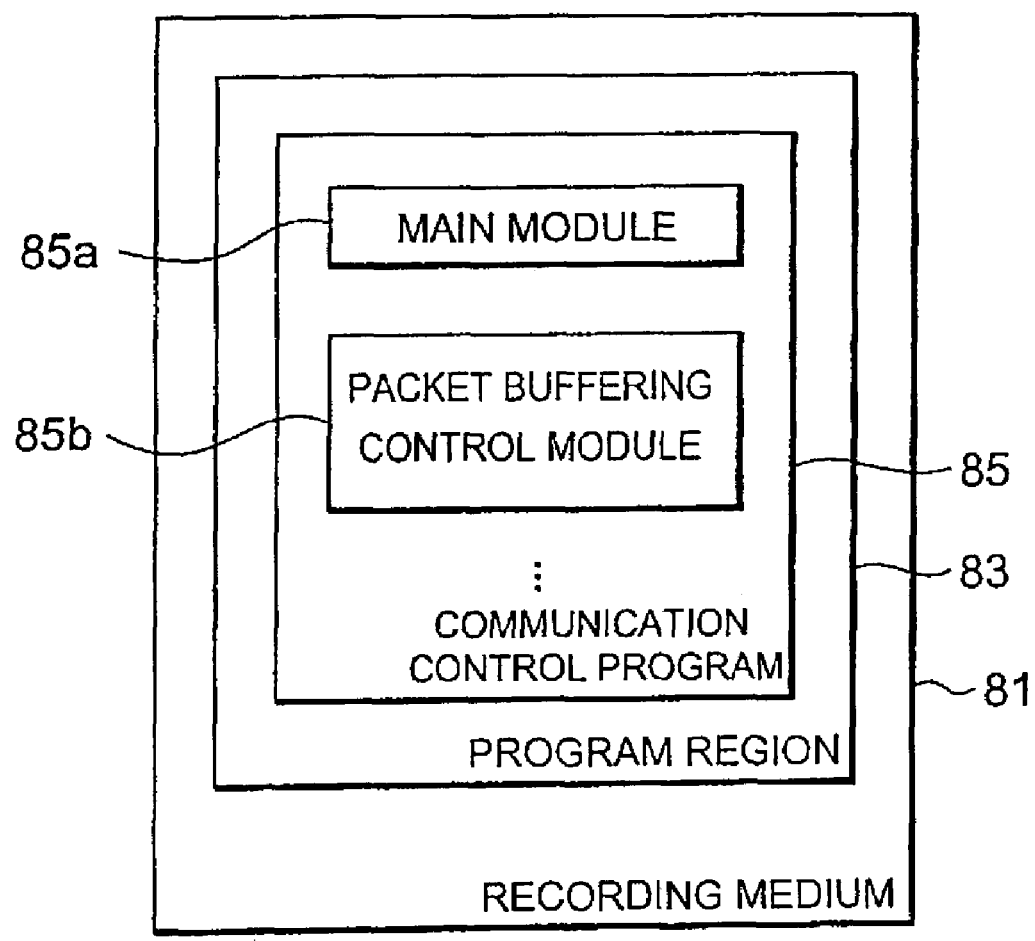
FIG. 17 is a view showing a constitution of a storage medium.

As shown in FIG. 17, the recording medium 81 comprises a program region 83 for recording a program. The communication control program 85 is recorded in this program region. The communication control program comprises a main module 85*a* for controlling processing and a packet buffering control module 85*b* for buffering a packet during a hand-off period of a mobile node and transmitting the buffered packet when the hand-off is complete.

By executing this communication control program, the computer functions as the mobile host 3 of the aforementioned first embodiment or the mobile router 53 of the aforementioned second embodiment. Thus packets which were to be transmitted during a hand-off period are not transmitted but are buffered during this hand-off period, and when the hand-off is complete, the buffered packets are transmitted. As a result, packet loss during a hand-off period can be prevented.

Finally, another communication control program according to an embodiment of the present invention will be described. In order to receive a TCP data segment and transmit a TCP ack in respect of this TCP data segment, this communication control program causes a computer to function as means for buffering a TCP ack during a hand-off period and transmitting the buffered TCP ack when the hand-off is complete. Further, in order to transmit a TCP data segment, the communication control program may also cause a computer to function as means for buffering a TCP data segment during a hand-off period and transmitting the buffered TCP data segment when the hand-off is complete. The communication control program is recorded in a computer readable recording medium, for example. Here, a recording medium is an object which is capable of altering the state of energy such as magnetism, light, or electricity in accordance with the descriptive content of a program for a reading device installed in the hardware resources of a computer to thereby transmit the descriptive content of the program to the reading device in a corresponding signal format. This recording medium may be, for example, a magnetic disk, an optical disk, a CD-ROM, or memory installed in a computer.

Figure 18:
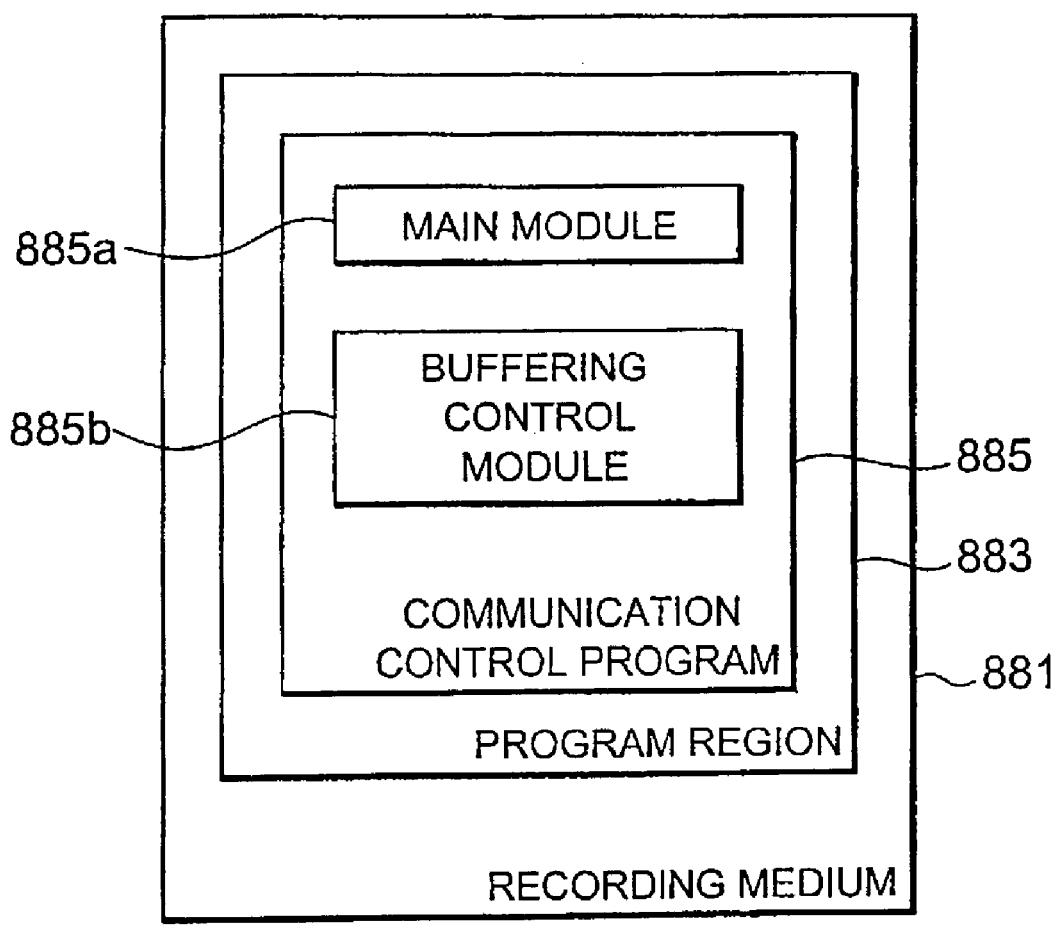
FIG. 18 is a view showing a constitution of a storage medium.
Figure 19:
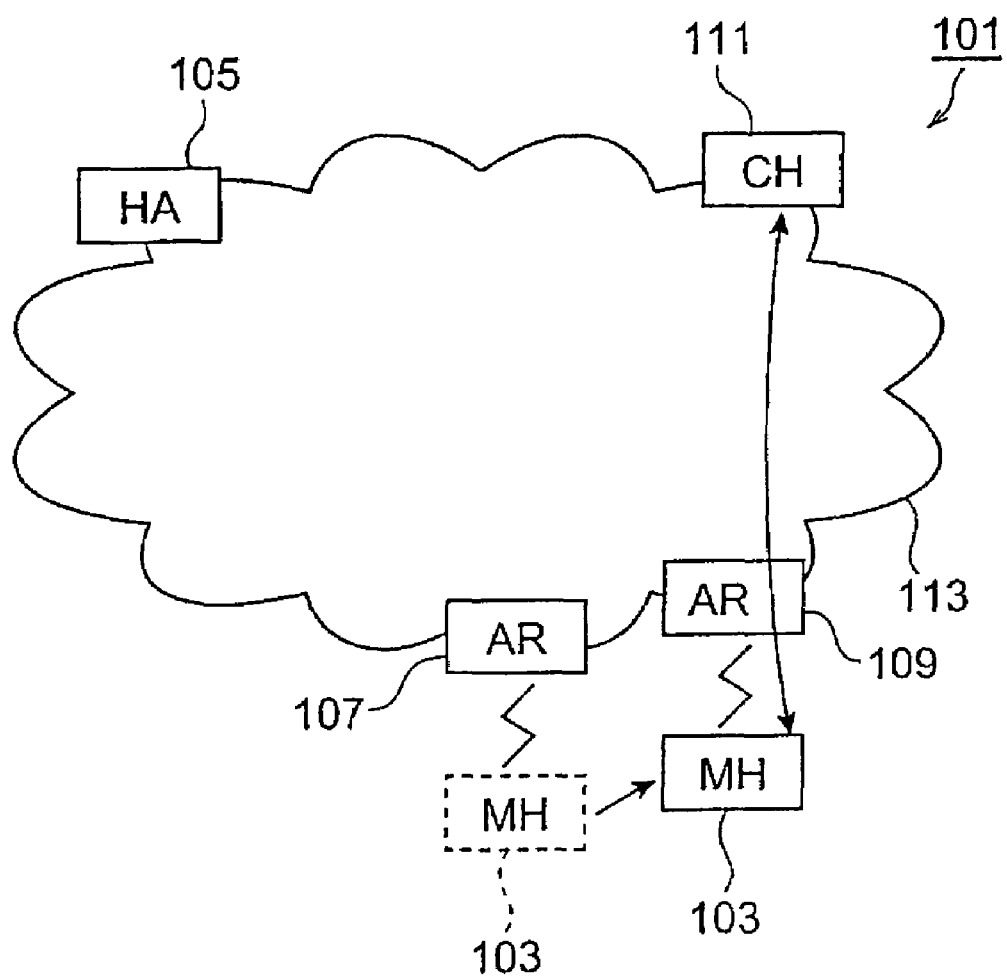
FIG. 19 is a block diagram showing an example of a conventional mobile communication system.

As shown in FIG. 18, the recording medium 881 comprises a program region 883 for recording a program. The communication control program 885 is recorded in this program region. The communication control program comprises a main module 885a for controlling processing and a buffering control module 885b for buffering a TCP ack during a hand-off period of a mobile node and transmitting the buffered TCP ack when the hand-off is complete. The buffering control module 885b may also be used when a mobile node transmits a TCP data segment for causing a computer to buffer the TCP data segment during a hand-off period and transmit the buffered TCP data segment when the hand-off is complete.

By executing this communication control program, the computer functions as the mobile host 303 of the aforementioned third and fourth embodiments or the mobile router 353 of the aforementioned fifth and sixth embodiments. Thus a dramatic deterioration in the TCP throughput during a hand-off by the mobile router 353 and the mobile host 303 can be prevented.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Applications No. 2002-68918 filed on Mar. 13, 2002 and No. 2002-68932 filed on Mar. 13, 2002 are hereby incorporated by reference.

What is claimed is:

1. A mobile node for transmitting a packet, comprising:
   means for buffering the packet within the mobile node during a hand-off period; and
   means for transmitting the buffered packet from the mobile node when the hand-off period is complete, wherein
   said means for transmitting includes means for determining a period during which the packet is buffered in the mobile node based on a connection status of a link layer of the mobile node,
   the period during which the packet is buffered in the mobile node is a period from a predetermined time before a beginning of a link layer disconnection period, during which the link layer of said mobile node is not connected to any links in order to switch connection points, to a point following an end of the link layer disconnection period, at which time an external router providing a newly connected link becomes a default external router, and
   said means for transmitting includes means for detecting the predetermined time before the beginning of the link layer disconnection period via a signal provided by a communications link interface module within the mobile node.

2. The mobile node according to claim 1,
   wherein said means for buffering does not buffer a router solicitation for requesting transmission of a router advertisement from the access router.

3. The mobile node according to claim 1, wherein said mobile node transmits at least one of a TCP data segment and a TCP acknowledgement signal corresponding to a TCP data segment, and
   said means for buffering buffers the at least one of the TCP data segment and the TCP acknowledgement signal during the hand-off period and the means for transmitting transmits the buffered at least one of the TCP data segment and the TCP acknowledgement signal when the hand-off is complete.

4. The mobile node according to claim 3,
   wherein the means for buffering buffers the TCP acknowledgement signal,
   said means for buffering performs buffering of the TCP acknowledgement signal for each TCP connection, and
   when, for each said TCP connection, a newly buffered TCP acknowledgement signal corresponds to a TCP data segment with a larger sequence number than a currently buffered TCP acknowledgement signal, the currently buffered TCP acknowledgement signal is replaced by a newly buffered TCP acknowledgement signal.

5. A mobile communication system, comprising:
   a mobile node for transmitting a packet and a plurality of access routers for providing said mobile node with a link, wherein said mobile node comprises:
   means for buffering the packet within the mobile node during a hand-off period, said means for buffering positioned within the mobile node; and
   means for transmitting the buffered packet from the mobile node when the hand-off period is complete, wherein
   said means for transmitting includes means for determining a period during which the packet is buffered in the mobile node based on a basis of a connection status of a link layer of the mobile node,
   the period during which the packet is buffered in the mobile node is a period from a predetermined time before a beginning of a link layer disconnection period, during which the link layer of said mobile node is not connected to any links in order to switch connection points, to a point following an end of the link layer disconnection period, at which time an external router providing a newly connected link becomes a default external router, and
   said means for transmitting includes means for detecting the predetermined time before the beginning of the link layer disconnection period via a signal provided by a communications link interface module within the mobile node.

6. A computer-readable medium encoded with a communication control program which, when executed by a processor in a mobile node configured to transmit a packet, causes the mobile node to perform a method comprising steps of: buffering the packet during a hand-off period in a buffer within the mobile node; transmitting the buffered packet from the mobile node when the hand-off period is complete; and determining the period during which the packet is buffered in the mobile node based on a connection status of a link layer of the mobile node, wherein the period during which the packet is buffered in the mobile node is a period from a predetermined time before a beginning of a link layer disconnection period, during which the link layer of said mobile node is not connected to any links in order to switch connection points, to a point following an end of the link layer disconnection period, at which time an external router providing a newly connected link becomes a default external router, and said transmitting includes detecting the predetermined time before the beginning of the link layer disconnection period via a signal provided by a communications link interface module within the mobile node.

7. The computer-readable medium according to claim 6, said method further comprising: not buffering a router solicitation for requesting transmission of a router advertisement from the access router.

8. The computer-readable medium communication control program according to claim 6, wherein, in order to transmit at least one of a TCP data segment and a TCP acknowledgement signal corresponding to a TCP data segment, the mobile node is caused to perform a step of buffering the at least one of a TCP data segment and a TCP acknowledgement signal during the hand-off period and for transmitting the buffered at least one of a TCP data segment and a TCP acknowledgement signal when the hand-off is complete.

9. The computer-readable medium communication control program according to claim 8, wherein the TCP acknowledgement signal is the buffered signal, and said method further comprises:
  buffering the TCP acknowledgement signal for each TCP connection, and when, for each said TCP connection, a newly buffered TCP acknowledgement signal corresponds to a TCP data segment with a larger sequence number than a currently buffered TCP acknowledgement signal, replacing the currently buffered TCP acknowledgement signal with a newly buffered TCP acknowledgement signal.

10. The mobile node of claim 1, wherein said means for buffering buffers data to be transmitted by the mobile node when the hand-off is complete.

11. A communications method, comprising:
  buffering a packet during a hand-off period in a buffer within a mobile node;
  transmitting the buffered packet from the mobile node when the hand-off period is complete; and
  determining a period during which the packet is buffered in the mobile node based on a connection status of a link layer of the mobile node, wherein
  the period during which the packet is buffered in the mobile node is a period from a predetermined time before a beginning of a link layer disconnection period, during which the link layer of said mobile node is not connected to any links in order to switch connection points, to a point following an end of the link layer disconnection period, at which time an external router providing a newly connected link becomes a default external router, and
  said transmitting includes detecting the predetermined time before the beginning of the link layer disconnection period via a signal provided by a communications link interface module within the mobile node.

* * * * *